United States Patent
Lee et al.

(10) Patent No.: US 7,228,392 B2
(45) Date of Patent: *Jun. 5, 2007

(54) WIRELESS DATA COMMUNICATIONS USING FIFO FOR SYNCHRONIZATION MEMORY

(75) Inventors: Sherman Lee, Rancho Palos Verdes, CA (US); Vivian Y. Chou, Alhambra, CA (US); John H. Lin, Downey, CA (US)

(73) Assignee: Broadcom Corporation, Irvine, CA (US)

( * ) Notice: Subject to any disclaimer, the term of this patent is extended or adjusted under 35 U.S.C. 154(b) by 603 days.

This patent is subject to a terminal disclaimer.

(21) Appl. No.: 10/413,689

(22) Filed: Apr. 15, 2003

(65) Prior Publication Data

US 2003/0194982 A1    Oct. 16, 2003

Related U.S. Application Data

(62) Division of application No. 09/593,583, filed on Jun. 12, 2000.

(51) Int. Cl.
  *G06F 12/02* (2006.01)

(52) U.S. Cl. ..................................... 711/154

(58) Field of Classification Search ............... 711/154, 711/221; 714/8
See application file for complete search history.

(56) References Cited

U.S. PATENT DOCUMENTS

| | | | |
|---|---|---|---|
| 4,897,813 A * | 1/1990 | Kumbasar | 365/49 |
| 5,587,953 A | 12/1996 | Chung | |
| 5,732,324 A | 3/1998 | Rieger | |
| 5,757,690 A * | 5/1998 | McMahon | 365/104 |
| 5,757,872 A | 5/1998 | Banu et al. | |
| 5,796,972 A | 8/1998 | Johnson | |
| 5,796,974 A | 8/1998 | Goddard | |
| 5,956,748 A | 9/1999 | New | |
| 6,055,285 A | 4/2000 | Alston | |
| 6,260,157 B1 * | 7/2001 | Schurecht et al. | 714/8 |
| 6,351,822 B1 * | 2/2002 | Wright et al. | 714/8 |
| 6,266,385 B1 | 7/2002 | Roy et al. | |
| 6,438,664 B1 * | 8/2002 | McGrath et al. | 711/154 |
| 6,650,880 B1 | 11/2003 | Lee | |
| 6,804,772 B2 * | 10/2004 | Lee et al. | 712/248 |
| 2004/0209587 A1 | 10/2004 | Lee et al. | |
| 2005/0010745 A1 | 1/2005 | Lee et al. | |

FOREIGN PATENT DOCUMENTS

EP    0 417 390 A2    3/1991

OTHER PUBLICATIONS

European Search Report Application No. EP 01 25 0211, Oct. 26, 2004, 4 pages, European Patent Office, Munich, Germany.

(Continued)

*Primary Examiner*—Kevin L. Ellis

(57) ABSTRACT

A microprocessor system architecture is disclosed which allows for the selective execution of programmed ROM microcode or, alternatively, RAM microcode if there has been a correction or update made to the ROM microcode originally programmed into the system. Patched or updated RAM microcode is utilized or executed only to the extent of changes to the ROM microcode, otherwise the ROM microcode is executed in its normal fashion. When a patch is received, it is loaded into system RAM along with instructions or other appropriate signals to direct the execution of the patched or updated microcode from RAM instead of the existing ROM microcode. Various methods are presented for selecting the execution of the appropriate microcode depending upon whether there have been changes made to it.

24 Claims, 24 Drawing Sheets

OTHER PUBLICATIONS

Giao N. Pham, et al., A High Throughput, Asynchronous, Dual Port FIFO Memory Implemented in ASIC Technology, May 1989, 4 pages, NCR Corporation, Colorado Springs, US.

Kwon, Hyuck, M., et al., Improved Zero-If Zero-Crossing Demodulator for Gaussian Minimum Shift Keying Signals in Land Mobile Channels, May 1996, 5 pages, Wichita State University, Wichita, US.

Prophet, Graham, Living in a Wireless Wonderland, Jun. 5, 2000, 9 pages, EDN Magazine.

"Specification of the Bluetooth System", Version 1.0B, Dec. 1, 1999, pp. 1-1082.

Dave Watola, "DS2 Digital Receiver Signal Processing Description", Apr. 7, 1998, pp. 1-12.

* cited by examiner

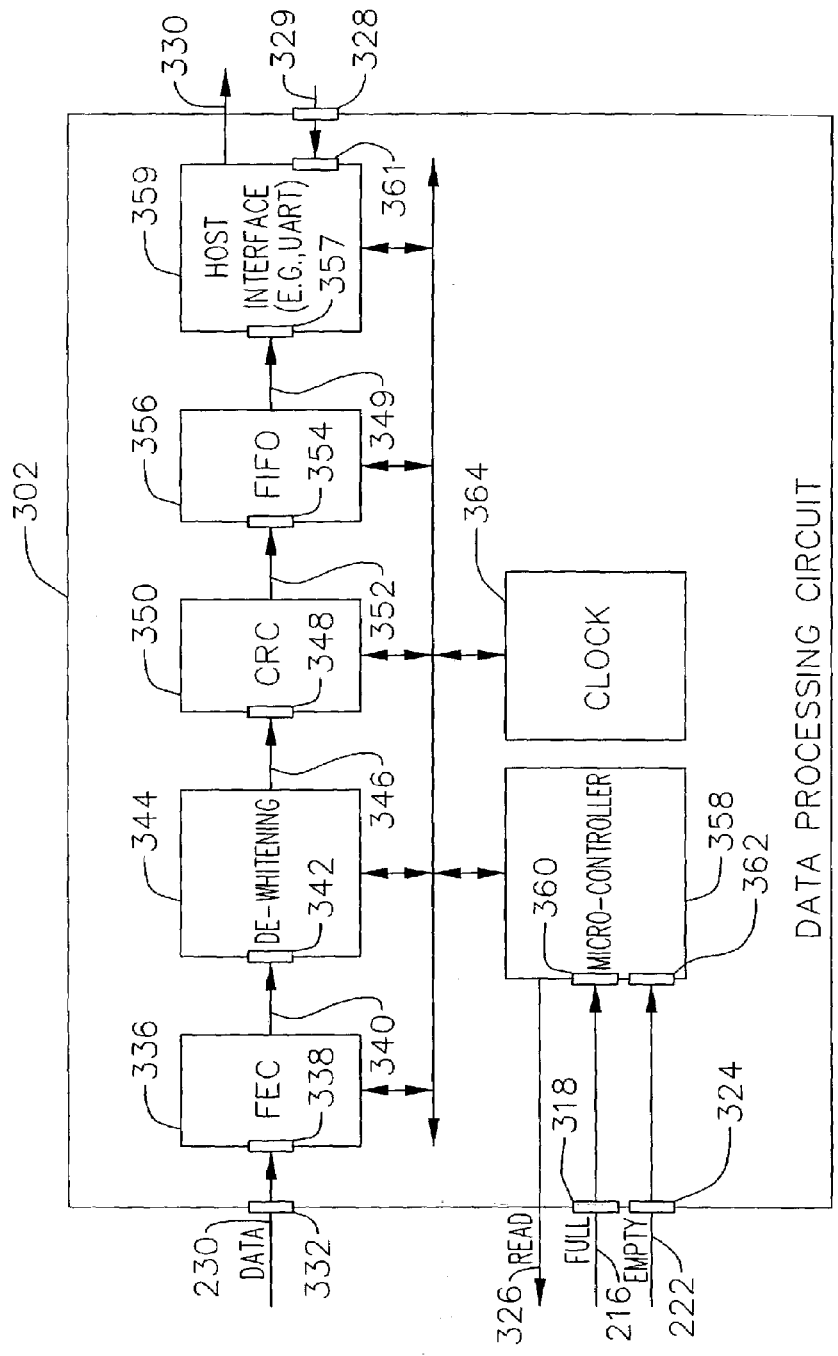

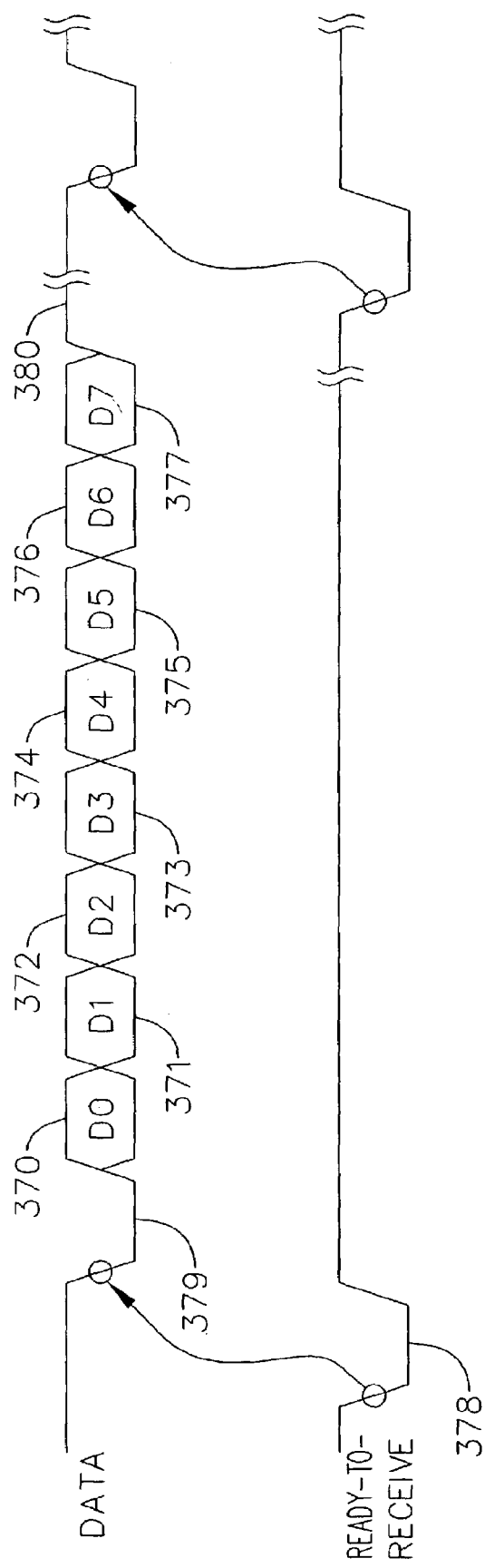

SELECT METHOD #1

SELECT METHOD #2

SELECT METHOD #3—UNPATCHED

SELECT METHOD #3-PATCHED

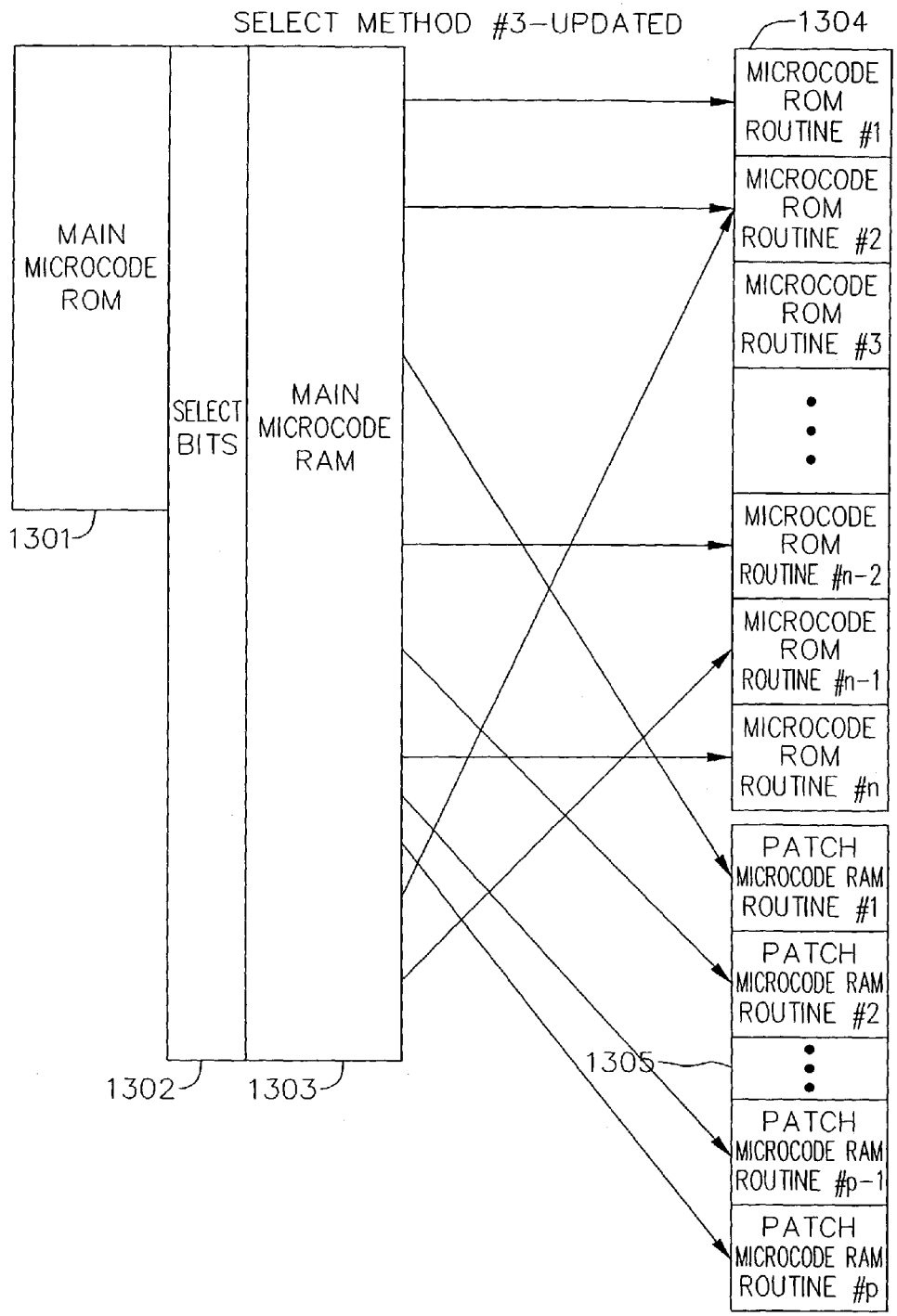

VALID/TRAP METHOD—UNPATCHED

VALID/TRAP METHOD-PATCHED

VALID/TRAP METHOD-UPDATED

INDEX METHOD—UNPATCHED

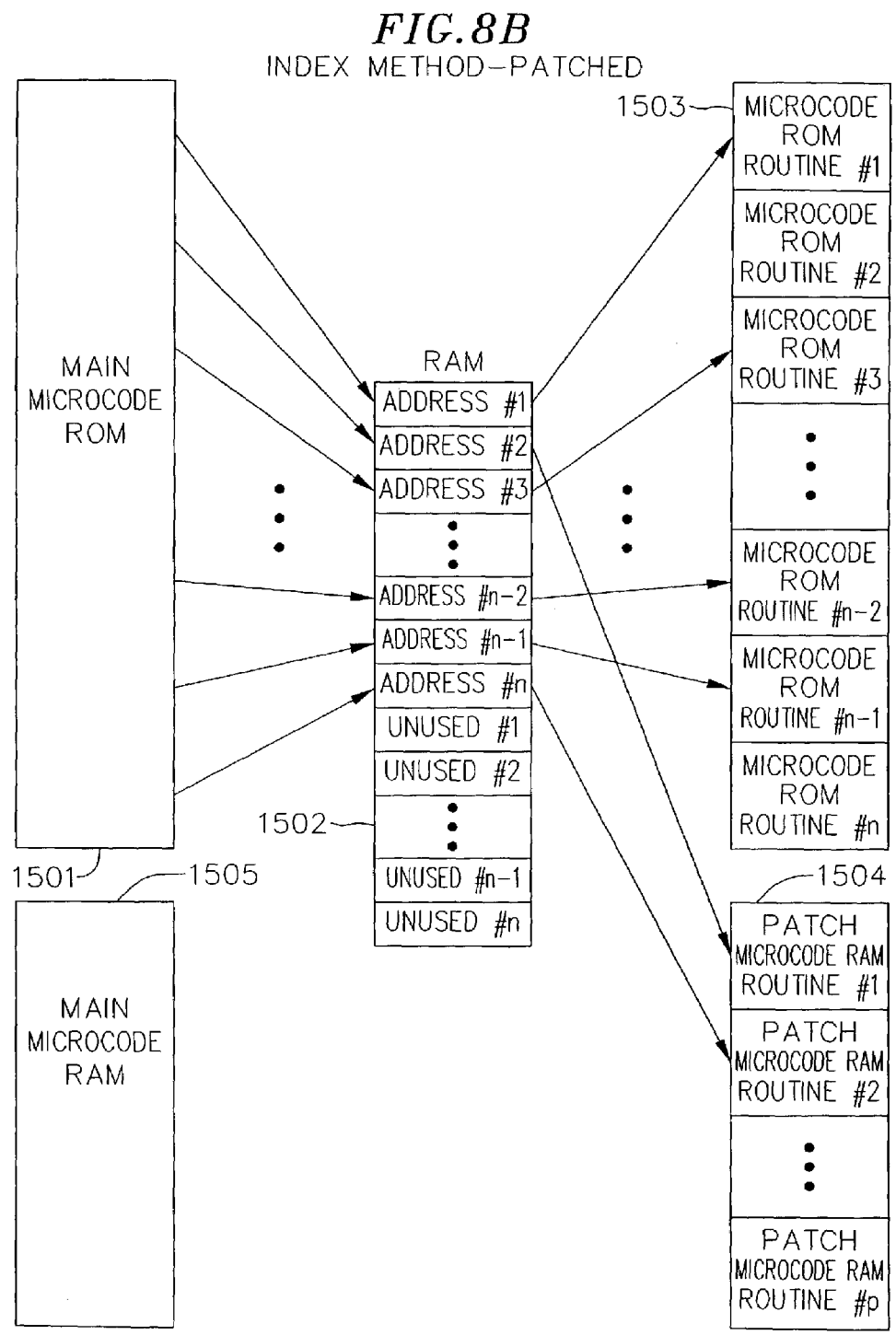

INDEX METHOD—UPDATED

WIRELESS DATA COMMUNICATIONS USING FIFO FOR SYNCHRONIZATION MEMORY

CROSS-REFERENCE TO RELATED APPLICATIONS

This application is a divisional of patent application Ser. No. 09/593,583, filed Jun. 12, 2000, the content of which is incorporated herein by reference.

BACKGROUND

1. Field of the Invention

This invention relates to wireless communication and more particularly to an apparatus that receives transmission of data synchronized to a clock that is out of phase with the clock of the apparatus.

This invention also relates to microprocessor system architecture, and more particularly to a microprocessor architecture that allows read-only memory (ROM) microcode to be effectively altered or enhanced without the need to reprogram or replace the ROM.

2. Description of Related Art

Bluetooth is the name of a well known and open technical specification for wireless communication of data and voice. Bluetooth allows the replacement of very short range cables (wires) now used to connect one device to another with one universal short-range radio link; for example, a computer can thereby communicate with its printer via a radio link instead of a cable. Bluetooth is characterized by operation in the 2.4 GHz and at variable transmission power depending on the distance between devices. For example, for a power class 2 Bluetooth device, the transmission power ranges from 1 mW to 2.5 mW. Bluetooth also allows computing devices to connect to a communicating device via a radio link. For example, a computer can communicate with a nearby cell phone via a radio link to access the Internet. Bluetooth units (radios) connect to each other in "piconets", which are formed by a master unit connecting up to seven slave units. In a piconet, the slave units are synchronized to the master unit's clock and hopping sequence. See "Specification of the Bluetooth System-Core v 1.0b" available from the Bluetooth Special Interest Group at its web site.

A typical Bluetooth conforming radio includes an RF (radio frequency) circuit and a baseband circuit. The RF circuit receives a frequency modulated electromagnetic signal (i.e., FM signal) carrying data synchronized to the clock signal ("external clock") of another Bluetooth radio. The baseband circuit includes a demodulator circuit that extracts the data and the external clock signal from the FM signal (symbol timing recovery). The baseband circuit also includes a PLL (phase lock loop) circuit that synchronizes the phase of the internal clock of the baseband circuit to the phase of the external clock to allow data processing circuits of the baseband to process the extracted data. The PLL circuit is necessary because even if the internal clock and the external clock may have substantially the same frequency, they may not have the same phase. Furthermore, interference to the FM signal as it travels through the air may also distort the representation of the frequency of the external clock in the FM signal.

A microprocessor is a central processing unit (CPU) enclosed in one integrated circuit (IC) package. Because of their small size and low cost, microprocessors have revolutionized digital system design technology, giving the designer the capability to create structures that were previously uneconomical. Microprocessors are used in a wide variety of applications. They can function as a CPU in a general purpose computer or as a processor unit in a special purpose, automated system.

Microprocessor systems usually incorporate several different types of memory devices to hold data for processing and instructions for system control. Memory devices come in a wide variety of forms. Two of the more common forms are generally referred to as "read-only memory" (ROM) and "random access memory" (RAM). In its simplest form, sometimes called "mask-programmed", a ROM memory device is manufactured with fixed contents. The binary information stored in the ROM is made permanent during the hardware production of the unit and cannot subsequently be altered. Such a ROM memory unit performs the read operation only; it does not have a write capability. ROM is most often used to hold microcode, the lowest level instructions that directly control a microprocessor.

By contrast, a RAM is a data storage device that can perform both the read and write function. A system CPU uses its RAM as a storage area for data, calculation results, and program instructions, drawing on this storage as necessary to perform the tasks required by programs. Its binary contents can easily be changed during operation and its stored data is typically erased or lost when the device incorporating it is powered off. Part of the initial "power-up" or boot routine for microprocessor systems includes the loading of desired or necessary code into RAM according to the system design.

Microprocessor systems may also incorporate some type of "non-volatile" memory, such as a hard-disk. Like RAM, such memory can usually be read or written to, but unlike RAM its content is preserved until over-written, even without system power.

More recent varieties of ROM provide for some limited programming capability after manufacture. PROM ("programmable read-only memory") devices can be programmed by the end user, but only once. EPROM ("erasable programmable read-only memory") can be erased and then reprogrammed, but must be removed from the system to do so. EEPROM ("electronic erasable read-only memory") can be erased and programmed electrically some limited number of times with standard supply voltages while in the circuit. However, such devices come with increased cost and limitations of their own. For example, EPROM must be removed from the system to be reprogrammed, and EEPROM must be erased and reprogrammed in its entirety, not selectively. For many processing systems, especially those used to perform set, repetitive tasks, it is desirable to use the cheapest and simplest (mask-programmed) ROM, with minimal reliance on more expensive RAM or other types of memory devices.

However, in even the simplest microprocessor system it may be desirable to alter the execution of the ROM microcode to, for example, correct errors in the code or add new capabilities to it. The disclosed invention allows for alterations in the processing of ROM microcode without incurring the added expense and complexity of integrating some form of programmable ROM into the system.

SUMMARY

In accordance with one aspect of the invention, a wireless device (e.g. radio) includes a receiver coupled to a first-in first-out memory device (FIFO). The, e.g. RF receiver includes a RF circuit that receives RF signals via an antenna, and a demodulator circuit that decodes the RF signals to data signals and recovered clock signals. The RF receiver stores the data signals into the FIFO using the recovered clock signals as write signals. In one implementation, a host device reads the data out from the FIFO with read signals synchronized to the system clock of the host device. In one variation, the write signals and the read signals are of similar frequencies. Thus, the host device can read the data received as RF signals without synchronizing its system clock to the recovered clock signals.

In another embodiment, a data processing circuit reads the data out from the FIFO with read signals synchronized to the system clock of the data processing circuit. In one implementation, the write signals and the read signals are of similar frequencies. Thus, the data processing circuit can process the data received as RF signals without synchronizing its system clock to the recovered clock signals. In one variation, the host device is coupled to the data processing circuit to receive the processed data.

Accordingly, the function performed in the prior and by PLL circuits are performed by FIFOs so that data received as RF signals may be processed by circuits without synchronizing their system clock to the recovered clock signals.

In accordance with another aspect of the invention, a microprocessor system architecture allows for the selective execution of programmed ROM microcode or, alternatively, RAM microcode if there has been a correction or update made to the ROM microcode originally programmed into the system. Patched or updated RAM microcode is utilized or executed only to the extent of changes to the ROM microcode, otherwise the ROM microcode is executed in its normal fashion.

When a patch is received, it is loaded into system RAM along with instructions or other appropriate signals to direct the execution of the patched or updated microcode from RAM instead of the existing ROM microcode. Those skilled in the art will appreciate and understand that a variety of techniques can be utilized to direct the execution of patched or updated RAM microcode rather than corresponding ROM microcode, only a few of which are discussed in some detail below.

BRIEF DESCRIPTION OF THE DRAWINGS

FIG. 3B illustrates, in a block diagram, a data processing circuit of FIG. 3A.

FIG. 3C illustrates, in a timing diagram, the input and output signals from a host interface of FIG. 3B in accordance with one embodiment of the invention.

In FIG. 4A, all microcode ROM is associated with an area of microcode RAM. In FIG. 4B, all microcode ROM shares a common address with microcode RAM, but additional address areas for microcode RAM are allocated to accept new microcode.

FIGS. 6A, 6B, and 6C illustrate a memory architecture in which the ROM is divided into main portion and a "routine" portion consisting of more detailed and lengthy instruction. A specified RAM bit is used to control the selection of main microcode ROM or main microcode RAM, and associated "routine" ROM or patches loaded into RAM. FIG. 6A illustrates the selection of microcode ROM in the absence of any patches. FIG. 6B illustrates the selection of patch microcode RAM when present, and FIG. 6C illustrates the selection of patch microcode RAM when new routines are available.

FIG. 7A illustrates the selection of main microcode ROM in the absence of any changes. FIG. 7B illustrates the selection of patch microcode RAM when changes are present, and FIG. 7C illustrates the selection of patch microcode RAM when new instructions are present.

FIGS. 8A, 8B, and 8C illustrate a memory architecture in which an "index" method is used to select the execution of ROM or RAM microcode as desired. FIG. 8A shows how ROM routines are mapped into RAM for execution in the absence of any patches or updates. FIG. 8B illustrates how RAM-mapped ROM routines are directed to patch microcode RAM for execution when existing RAM microcode is modified. FIG. 8C illustrates how new microcode routines are executed.

DETAILED DESCRIPTION

Figure 1:
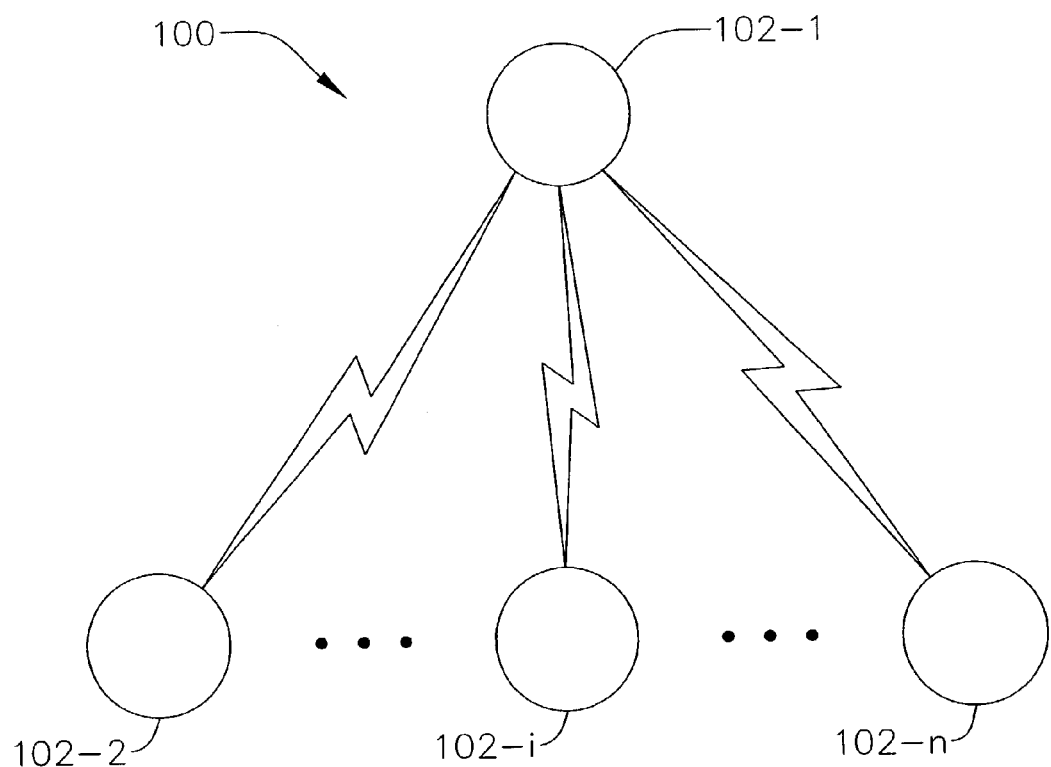
FIG. 1 illustrates, in a block diagram, a wireless network involving wireless devices.

A wireless network 100 (FIG. 1) includes a plurality of wireless devices 102-1, 102-2 ... 102-i ... 102-n ($2 \leq i \leq n$). Wireless network 100 includes radio frequency (RF) networks, optical networks, and infrared networks. Wireless network 100 is, for example, a Bluetooth piconet where wireless device 102-1 is a master Bluetooth radio and wireless devices 102-2 to 102-n are slave Bluetooth radios. As one skilled in the art understands, a Bluetooth piconet can form part of a larger Bluetooth scatternet.

Figure 2A:
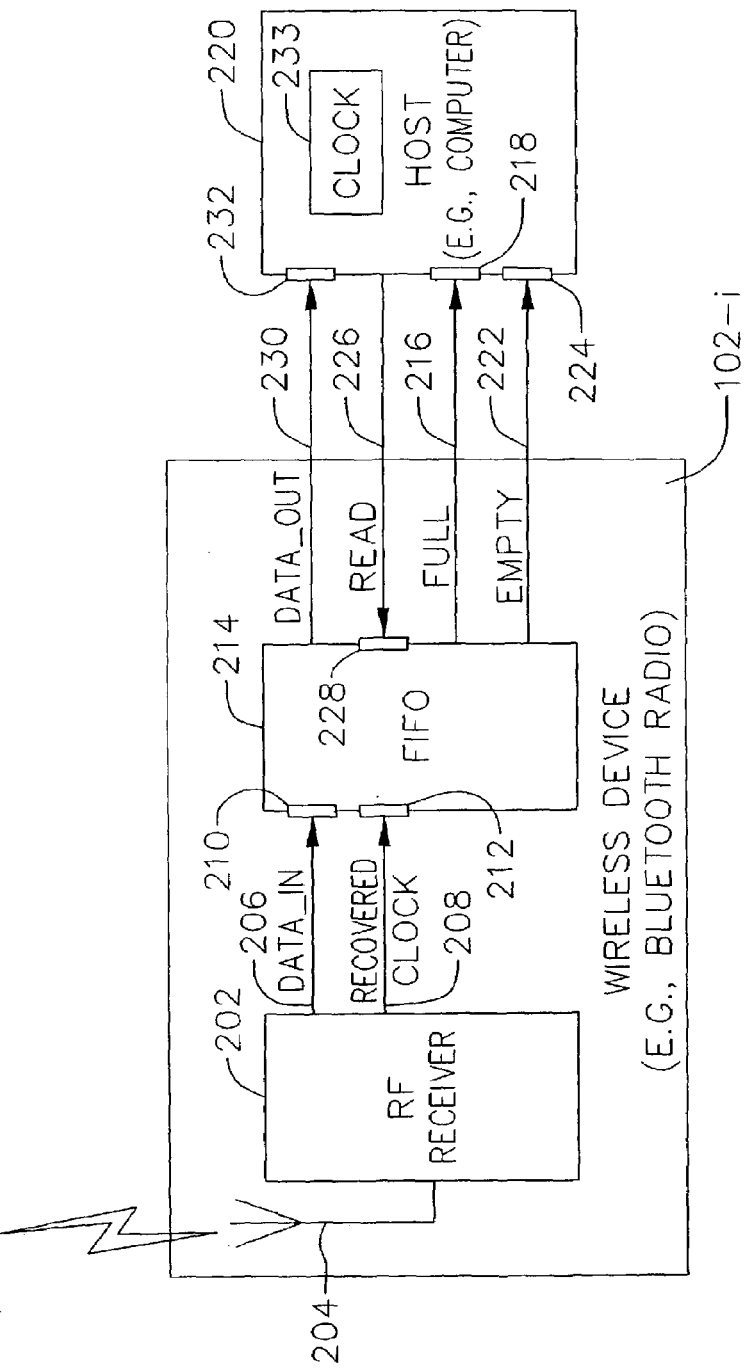
FIG. 2A illustrates, in a block diagram, a wireless device of FIG. 1 in accordance with one embodiment of the invention.

In accordance with one aspect of the invention hereafter referred to as "thin baseband/host-based", wireless device 102-*i* (FIG. 2A) performs radio and baseband modulation functions in circuitry. A host 220 performs all other baseband, link management, and protocol stack functions through software. Host 220 includes a high performance and low latency host processor (e.g., reduced instruction-set computing processors) capable of handling time-critical link management functions. Such processors are available from ARM Ltd. of Cambridge, England, MIPS Technologies, Inc. of Mountain View, ARC Cores, Inc. of San Jose, and Tensillica of Santa Clara.

Wireless device 102-*i* includes in one embodiment a conventional radio frequency (RF) receiver 202 (FIG. 2A) that receives RF signals from another Bluetooth radio via an antenna 204. The RF signals carry data synchronized to the clock ("external clock") of the another Bluetooth radio. RF receiver 202 decodes the RF signals to recover the data signals and the external clock signals (symbol timing recovery). RF receiver 202 respectively outputs the data signals and the external clock signals via respective lines 206 and 208.

Lines 206 and 208 are respectively coupled to input terminals 210 and 212 of a conventional first-in first-out memory device (FIFO) 214. FIFO 214 receives the external clock signals ("recovered clock signals") as write signals from RF receiver 202. When FIFO 214 receives an active recovered clock signal on terminal 212, FIFO 214 writes the data signal received on terminal 210 from RF receiver 202 into one of its empty memory locations indicated by a write pointer. Thus, the input data to FIFO 214 is in response to the recovered clock signals.

When FIFO 214 is full, it outputs an active full signal via a line 216 coupled to a terminal 218 of host 220. Conversely, when FIFO 214 is empty, it outputs an active empty signal via a line 222 coupled to a terminal 224 of host 220. Host 220 reads the data stored in FIFO 214 by driving an active read signal via a line 226 coupled to input terminal 228 of FIFO 214. In response to the active read signal on its terminal 228, FIFO 214 outputs the data in the memory location pointed to by a read pointer via a line 230 coupled to an input terminal 232 of host 220. Since the read signal from host 220 is synchronized with a clock 233 of host 220, the data read out of FIFO 214 is synchronized with clock 233.

Figure 2B:
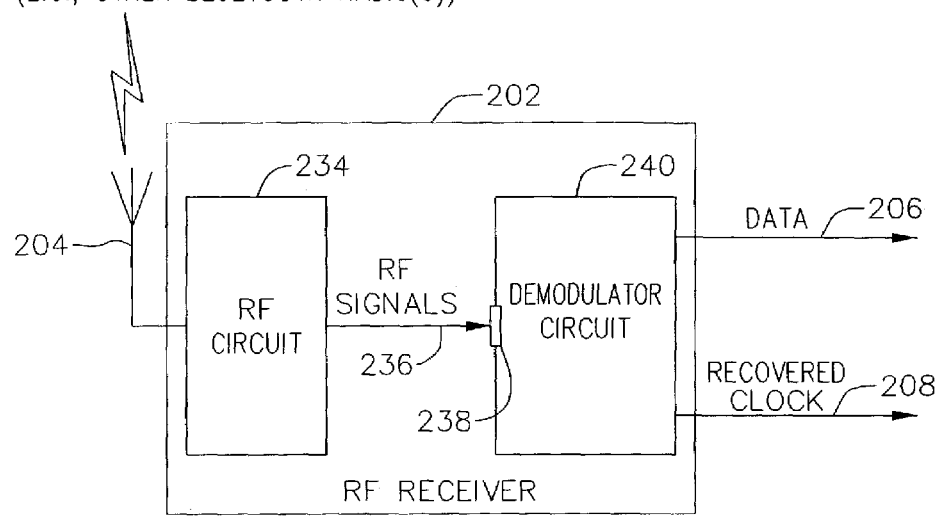
FIG. 2B illustrates, in a block diagram, a radio frequency (RF) receiver of FIG. 2A.

In one embodiment, RF receiver 202 comprises a suitable RF circuit 234 (FIG. 2B) that receives the FM signals transmitted by other Bluetooth radio(s). For a description of one embodiment of RF circuit 234, see U.S. patent application Ser. No. 09/591,925, filed Jun. 12, 2000, and U.S. patent application Ser. No. 09/592,016, filed Jun. 12, 2000, the contents of which are incorporated by reference herein in their entirety. Another suitable embodiment of RF circuit 234 is Radio Module PBA31 301 from Ericsson.

RF circuit 234 outputs the RF signals via a line 236 coupled to a terminal 238 of a suitable demodulator circuit 240. Demodulator circuit 240 extracts the data signals and the recovered clock signals from the RF signals. Demodulator circuit 240 outputs the data signals and the recovered clock signals via respective lines 206 and 208. Demodulator circuit 240 is, for example in one embodiment, implemented by Verilog source code listed in Appendix A. Another example of a suitable demodulator is modeled by C source code listed in Appendix B. One skilled in the art can translate the C source code to Verilog source code to synthesize a suitable demodulator.

Figure 2C:
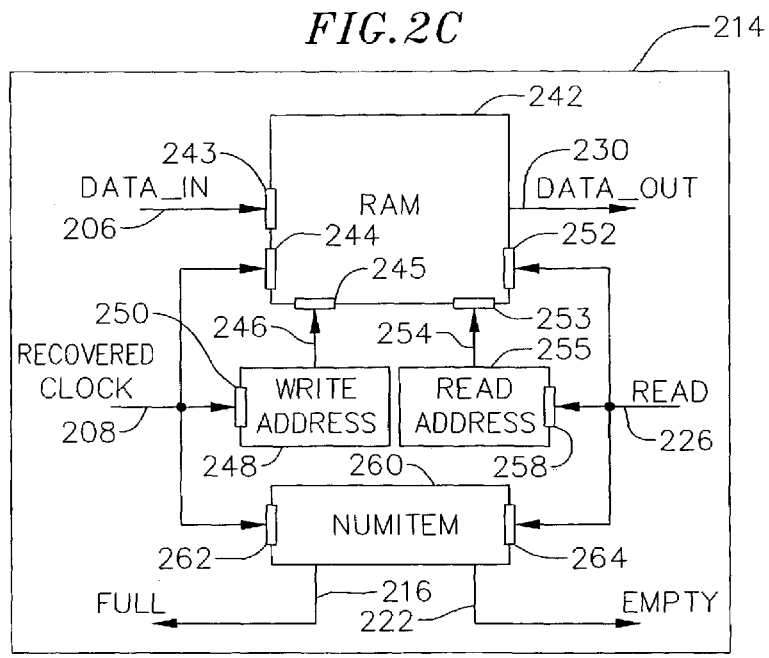
FIG. 2C illustrates, in a block diagram, a first-in first-out memory device (FIFO) of FIG. 2A.
Figure 2D:
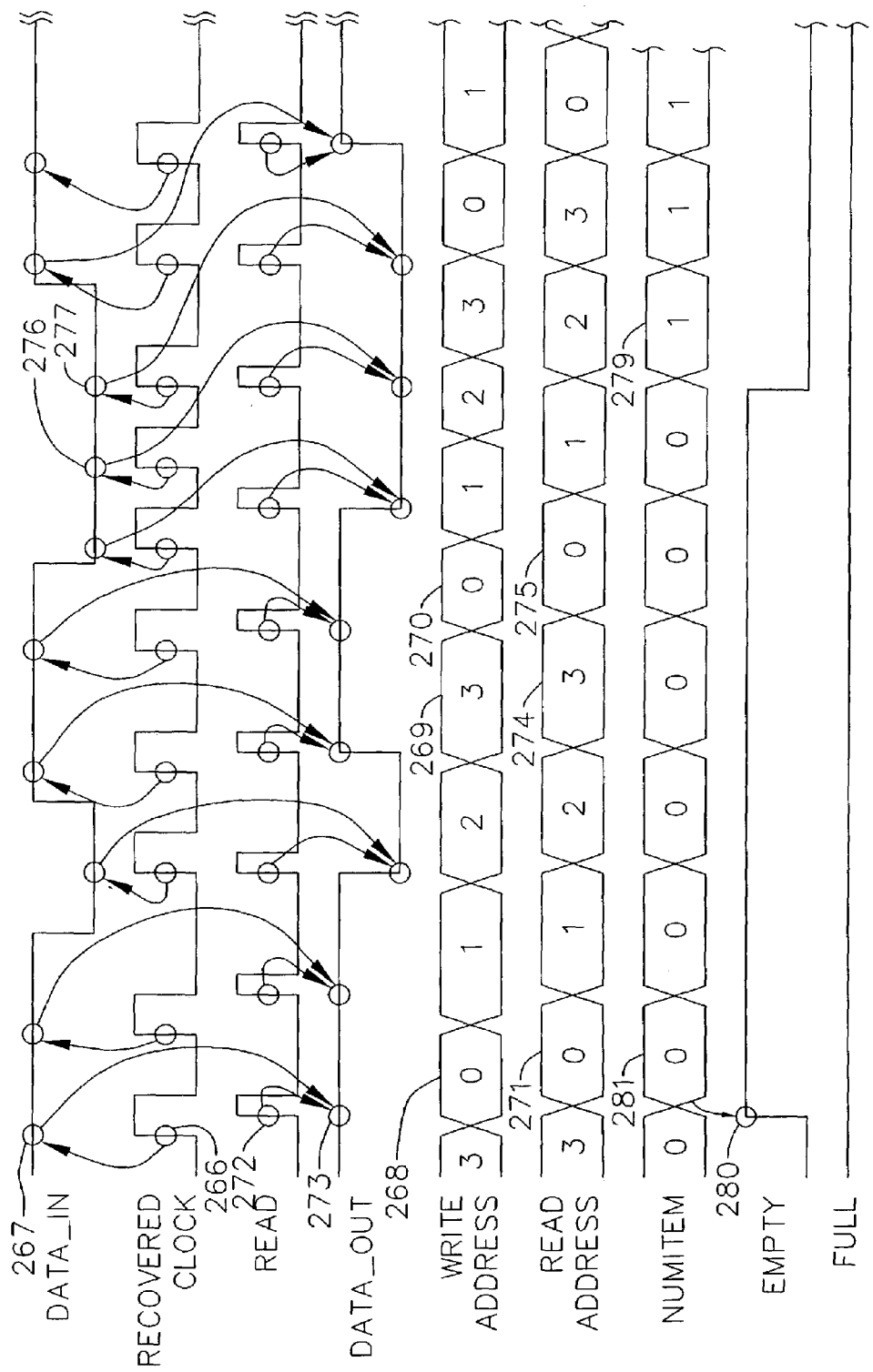
FIG. 2D illustrates, in a timing diagram, the input and output signals from the FIFO of FIG. 2C in accordance with one embodiment of the invention.

In one embodiment, FIFO 214 includes a random access memory (RAM) 242 (FIG. 2C) that receives data on a terminal 243 coupled to line 206, write signals (i.e., recovered clock signals) on a terminal 244 coupled to line 208, and write addresses on a terminal 245 coupled to a line 246 of a counter (write pointer) 248. RAM 242 stores the data (e.g., data 267 in FIG. 2D) received on a terminal 243 in the write address (e.g., address 268 in FIG. 2D) indicated by counter 248 each time RAM 242 receives an active write signal (e.g., signal 266 in FIG. 2D) on terminal 243. Counter 248 increments the write address each time counter 248 receives an active write signal (e.g., signal 266 in FIG. 2D) on a terminal 250 coupled to line 208. Counter 248 wraps around once it reaches the total number of memory locations in RAM 242 (e.g., the transition from address 269 to 270).

RAM 242 further receives a read signal on a terminal 252 coupled to line 226, and a read address on a terminal 253 coupled to a line 254 of a counter (read pointer) 255. RAM 242 outputs the data (e.g., data 273 in FIG. 2D) in the memory address (e.g., address 271 in FIG. 2D) indicated by counter 255 each time RAM 242 receives an active read signal (e.g., signal 272 in FIG. 2D) on a terminal 252. Similar to counter 248, counter 255 increments the read address each time counter 255 receives an active read signal (e.g., signal 272 in FIG. 2D) on a terminal 258 coupled to line 226. Counter 255 wraps around once it reaches the total number of memory locations in RAM 242 (e.g., transition from address 274 to 275 in FIG. 2D).

A counter 260 stores a numitem that indicates whether RAM 242 is full or empty. Counter 260 increments the numitem each time it receives an active write signal on a terminal 262 coupled to line 208. Conversely, counter 260 decrements the numitem each time it receives an active read signal on a terminal 264 coupled to line 226. For example, when two data signals (e.g., data 276 and 277 in FIG. 2D) are written into RAM 242 while only one data signal (e.g., data 278 that corresponds to data 276 in FIG. 2D) is read out of RAM 242, numitem (e.g., numitem 279 in FIG. 2D) has a value of one. Counter 260 outputs an active full signal via line 216 when the numitem is equal to the total number of memory locations in RAM 242. Conversely, counter 260 outputs an active empty signal (e.g., signal 280 in FIG. 2D) via line 222 when the numitem (e.g., numitem 281 in FIG. 2D) is equal to zero.

In one embodiment, host 220 read data out from FIFO 214 at relatively the same rate as data is being written into FIFO 214 (i.e., the frequency of the recovered clock). If data is being read out from FIFO 214 at substantially the same rate as data is being written into FIFO 214, the size of FIFO 214 can be minimized (e.g., 2 bits). However, the write rate may not be as constant as the read rate because the write signal is synchronized to the recovered clock. Thus, the size of FIFO 214 is equal to the product of the (1) variation between the write rate and the read rate (e.g., frequency variation between the recovered clock and the system clock) and (2) the length of the data to be transmitted. Specifically, the minimum required size of the FIFO 214 between any two times (e.g., $t_1$ and a $t_2$) may be defined as:

$$\int_{t_1}^{t_2} [F_{in}(t) - F_{out}(t)] dt$$

where $F_{in}(t)$ is the data rate into FIFO 214 as a function of time, and $F_{out}(t)$ is the data rate out from FIFO 214 as a function of time. In one implementation, FIFO 214 is a four bit FIFO.

In another embodiment, host 220 reads the data from FIFO 214 in bursts because host 220 operates at a higher clock speed than the recovered clock. Host 220 can allow the bits to be stored in FIFO 214 and read the data out in a burst before FIFO 214 overflows.

FIFO 214 is, for example in one embodiment, implemented by Verilog source code listed in Appendix C. As one skilled in the art understands, FIFOs can be implemented in a variety of ways by flip-flops, registers, memory arrays, random access memory (RAM), and other similar components.

As described above, FIFO 214 allows host 220 to read data signals transmitted from another Bluetooth radio without retiming its clock to the external clock of the other Bluetooth radio. Thus, the prior art PLL circuit is replaced here with one embodiment by a FIFO 214 that is both simple and inexpensive to implement. Accordingly, a Bluetooth radio utilizing FIFO 214 offers a more efficient design than other Bluetooth radios that utilize PLL circuits to retime their clocks.

In accordance with another aspect of the invention hereafter referred to as "host-based", wireless device 102-*i* performs all radio, baseband, and time-critical link management functions in circuitry rather than in the host. Host 220 performs all non-time critical link management and protocol stack functions (in software). Host 220 includes a host processor such as an X86 or 8051 based processor.

Wireless device 102-*i* includes a data processing circuit 302 (FIG. 3A) that reads and processes the data from FIFO 214. Data processing circuit 302 has terminals 318, 324, and 332 respectively coupled to lines 216, 222, and 230 of FIFO 214. To read data from FIFO 214, data processing circuit 302 drives an active read signal via a line 326 coupled to terminal 228 of FIFO 214.

In one embodiment, data processing circuit 302 includes a conventional forward error correction (FEC) decoding circuit 336 (FIG. 3B) having input terminal 338 coupled to line 230. FEC decoding circuit 336 uses correction bits embedded in the data to repair any error in the transmitted data received at terminal 338. If there is no error, FEC circuit 336 removes the correction bits from the data stream. This is as set forth in the Bluetooth specifications. FEC circuit 336 outputs the data stream via a line 340 to input terminal 342 of a de-whitening circuit 344.

Conventional de-whitening circuit 344 descrambles the data with a "whitening" word used to randomize the data from highly redundant patterns and to minimize DC bias in the packet. This is as set forth in the Bluetooth specifications. De-whitening circuit 344 outputs the data stream via a line 346 to input terminal 348 of a conventional cyclical redundancy check (CRC) circuit 350. CRC circuit 350 detects data transmission error by performing CRC checking. CRC circuit 350 outputs the data stream via a line 352 to input terminal 354 of a suitable FIFO 356.

FIFO 356 stores the data received from CRC circuit 350. FIFO 356 outputs the data via a line 349 coupled to input terminal 357 of a host interface 359. Host interface 359 reads data out from FIFO 356 (e.g., bits 370 to 377 in FIG. 3C) to an output line 330 coupled to terminal 232 of host 220 when host 220 outputs an inactive ready-to-receive signal (e.g., signal 378 in FIG. 3C) on a line 329 coupled to a terminal 361 of host interface 359. Host interface 359 includes a start bit and an end bit (e.g., bits 379 and 380, respectively, in FIG. 3C) at the start and the end of the data transmission to host 220. Host interface 359 is, for example, coupled to a XR16C850 UART (universal asynchronous receiver and transmitter) made by EXAR Corporation of Fremont, Calif., that forms part of host 220.

Figure 3A:
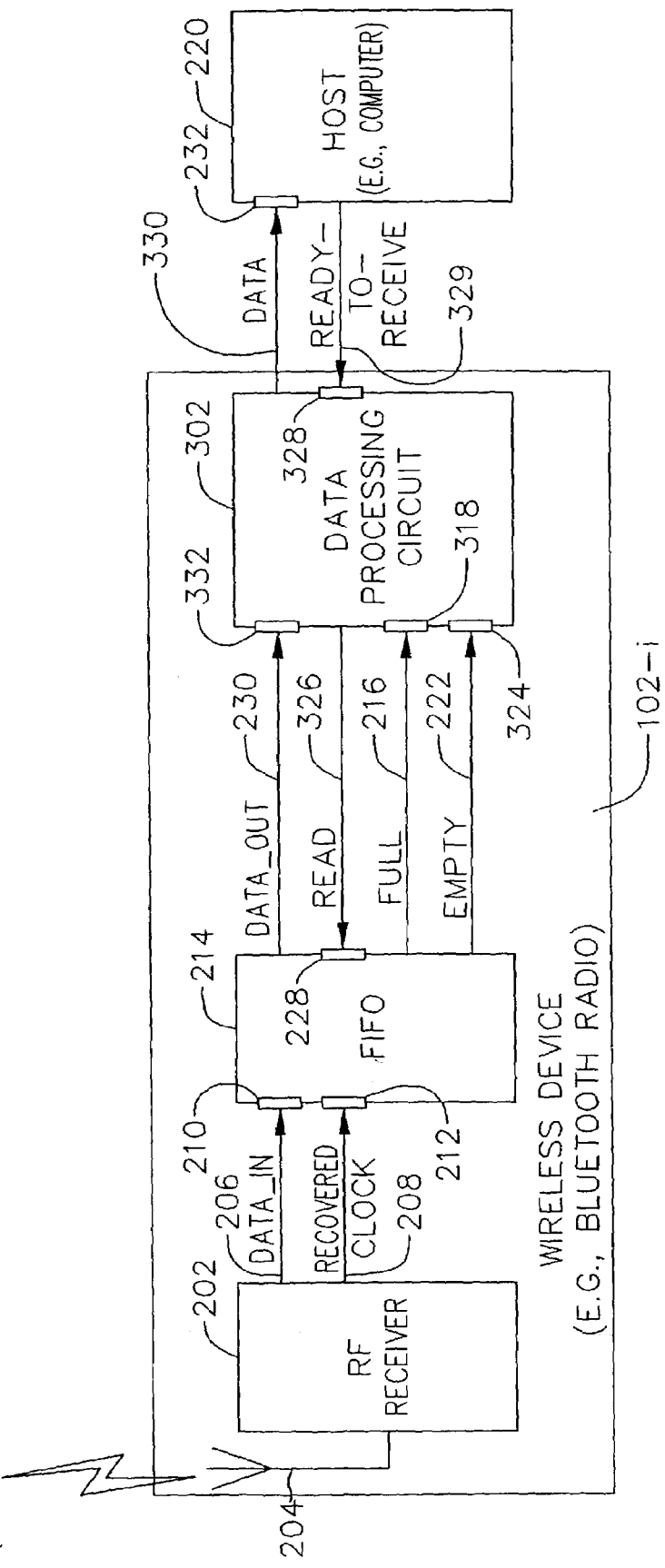
FIG. 3A illustrates, in a block diagram, a wireless device of FIG. 1 in accordance with another embodiment of the invention.

A microcontroller 358 controls the data flow through FIFO 214, FEC circuit 336, de-whitening circuit 344, CRC circuit 350, FIFO 356, and host interface 359. (Microcontroller is not the host, which as in FIG. 3A is external to date processing circuit 302.) To read data from FIFO 214 to FEC circuit 336, microcontroller 358 drives an active read signal via a line 326 coupled to terminal 228 of FIFO 214. Microcontroller 358 has terminals 360 and 362 respectively coupled to lines 216 and 224 of FIFO 214 to determine if FIFO 214 is full or empty. Microcontroller 358 may read data out from FIFO 214 at a constant rate or in bursts depending on the embodiment.

Microcontroller 358 also enables FEC circuit 336, de-whitening circuit 344, and/or CRC circuit 350 depending on the type of data received. Microcontroller 358 instructs FIFO 356 whether to accept or reject the data received from CRC 350 depending if FEC 336 or CRC 350 detects an error in the data. Microcontroller 358, for example, executes microcode listed in Appendix D.

A clock source 364 provides clock signals to FEC circuit 336, de-whitening circuit 344, CRC circuit 350, FIFO 356, microcontroller 358, and host interface 359. Data processing circuit 302 is, for example, implemented by Verilog source code listed in Appendix F.

In accordance with yet another aspect of the invention hereafter referred as "stand alone", wireless device 102-*i* performs the radio, the base, and the link management functions in circuitry. Host 220 is not necessary in this aspect because data processing circuit 302 includes application specific circuitry that allows wireless device 102-*i* to operate independently of a host. For example, wireless device 102-*i* may be a wireless headset that allows a user to receive signals from another Bluetooth radio enabled device.

Although one aspect of the invention has been described with reference to particular embodiments, the description is only of examples and should not be taken as a limitation. For example, although the above disclosure refers to the Bluetooth specifications, the present method and apparatus may be used in other wireless applications where the data received is synchronized to a clock of similar frequency but out of phase with the internal clock. This is not limited to RF, but includes optical and infrared communications. Furthermore, radio 102-*i* can be implemented as an integrated circuit (on a single chip) or as separate chips that can be coupled. Various other adaptations and combinations of features of the embodiments disclosed are within the scope of the invention as defined by the following claims.

As used herein, the term "patch" is intended to mean any correction, change, or alteration to the original microcode stored in a microprocessor system's read-only memory (ROM). The terms "patch" or "update" may also be used herein to refer to microcode developed after the original programming of system ROM microcode for the implementation of new instructions or routines.

As used herein, the term "microcode" is intended to mean the lowest level instructions that directly control a microprocessor.

There are several reasons why it might be desirable or even necessary to make changes in the programmed ROM of a microprocessor, corrections to existing code or the addition of new code being chief among them. For systems utilizing mask-produced (unalterable) ROM, such changes are not possible with existing memory and system architectures. Thus, to correct errors in the microcode, or to implement new capabilities, it is necessary to completely replace the defective or outmoded ROM devices if not the entire unit incorporating them, an expensive and inconvenient process.

The invention disclosed herein effectively allows for changes in otherwise unalterable ROM microcode, by loading microcode changes into allocated RAM and then providing for the selective execution of the existing ROM microcode or the changed RAM microcode. The disclosed techniques can be applied to any microprocessor system, but will be most beneficial for those systems that for economic or other reasons primarily rely on ROM memory devices that are programmed at system manufacture and incapable of alteration once programmed.

Depending upon the particular embodiment, as more fully discussed below, each address of at least one portion of the designated RAM address area(s) will contain one or more control or "select" bits to signal a change to existing ROM microcode. During program execution, when the select bit is detected, the system is directed to execute the changed RAM microcode rather than existing ROM microcode.

The RAM is organized into storage units that are larger than the ROM storage units, and logically divided into two sections. The first section of each RAM storage unit is of the same fixed size as each ROM storage unit, and is used to store the changed or new (patched) microcode. The second section of each RAM storage unit is used to control the ultimate selection of either original ROM or RAM microcode for system execution. For those skilled in the art, it is well understood how to implement a memory system design of the type described for the RAM.

A multiplexer has its inputs coupled, respectively, to the ROM and to that section of the patch RAM containing the patch microcode, if any. The select input terminal of the multiplexer is coupled to the second section of patch RAM, containing the signal telling the system whether it is to execute the ROM or the patched RAM microcode. This input select signal is used by the multiplexer to select either a ROM or a patch RAM routine for output. The output of the multiplexer, whether ROM or patch RAM, is then processed for further execution.

Patch microcode can be introduced into the system in a variety of ways. It can be received and taken into the system in the same manner as other forms of data by, for example, modem, wireless data link, disk, or CD. Once received, the patch may be stored in any non-volatile memory device accessible by the system, where it will be available for subsequent loading into the patch RAM. Alternatively, when initially received from an external source, the patch microcode may be simultaneously loaded into patch RAM (for immediate use) and into nonvolatile memory for more permanent storage and future access.

There are a variety of methods for initiating the use of patch RAM microcode instead of or in addition to original ROM microcode, as discussed in the following embodiments.

Figures 4, 4A:
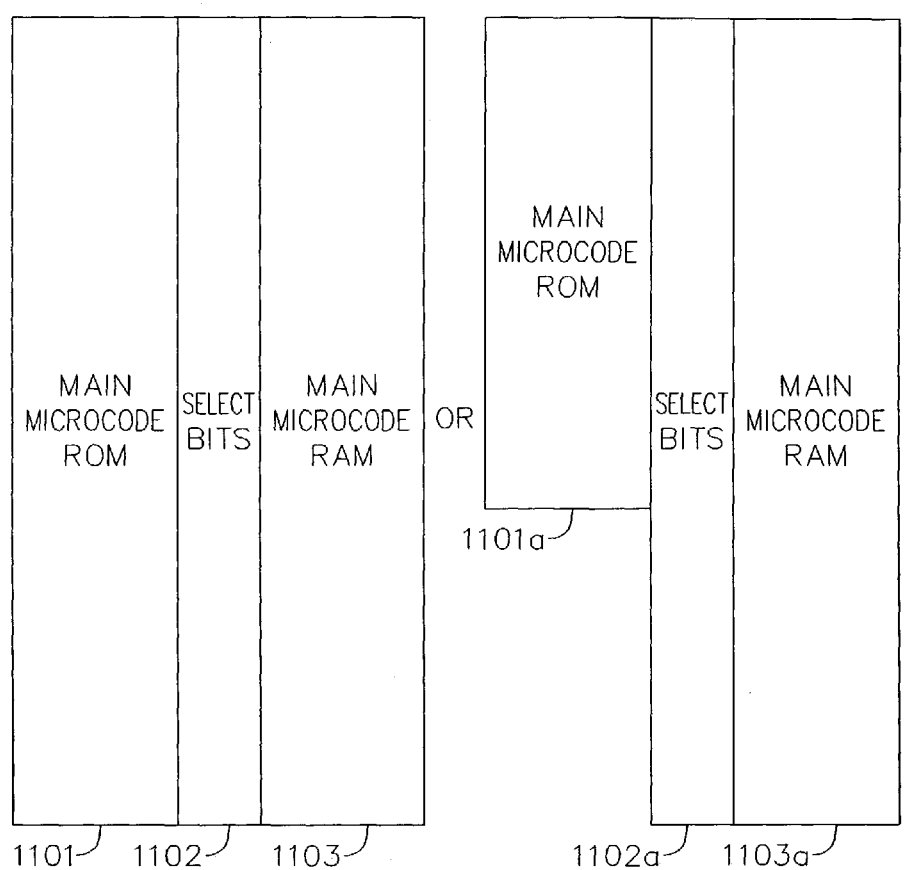
FIGS. 4 and 4A illustrate alternative embodiments of a memory architecture in which main microcode ROM and main microcode RAM share a common memory address area, along with a "select" RAM bit used to control the selection of main microcode ROM or main microcode RAM for execution.

FIGS. 4 and 4A illustrates an architecture in which ROM (1101 or 1101a), RAM (1103) and a RAM select bit share a common address. The select bit is used to determine whether the associated RAM or ROM instructions are to be executed.

Figure 8A:
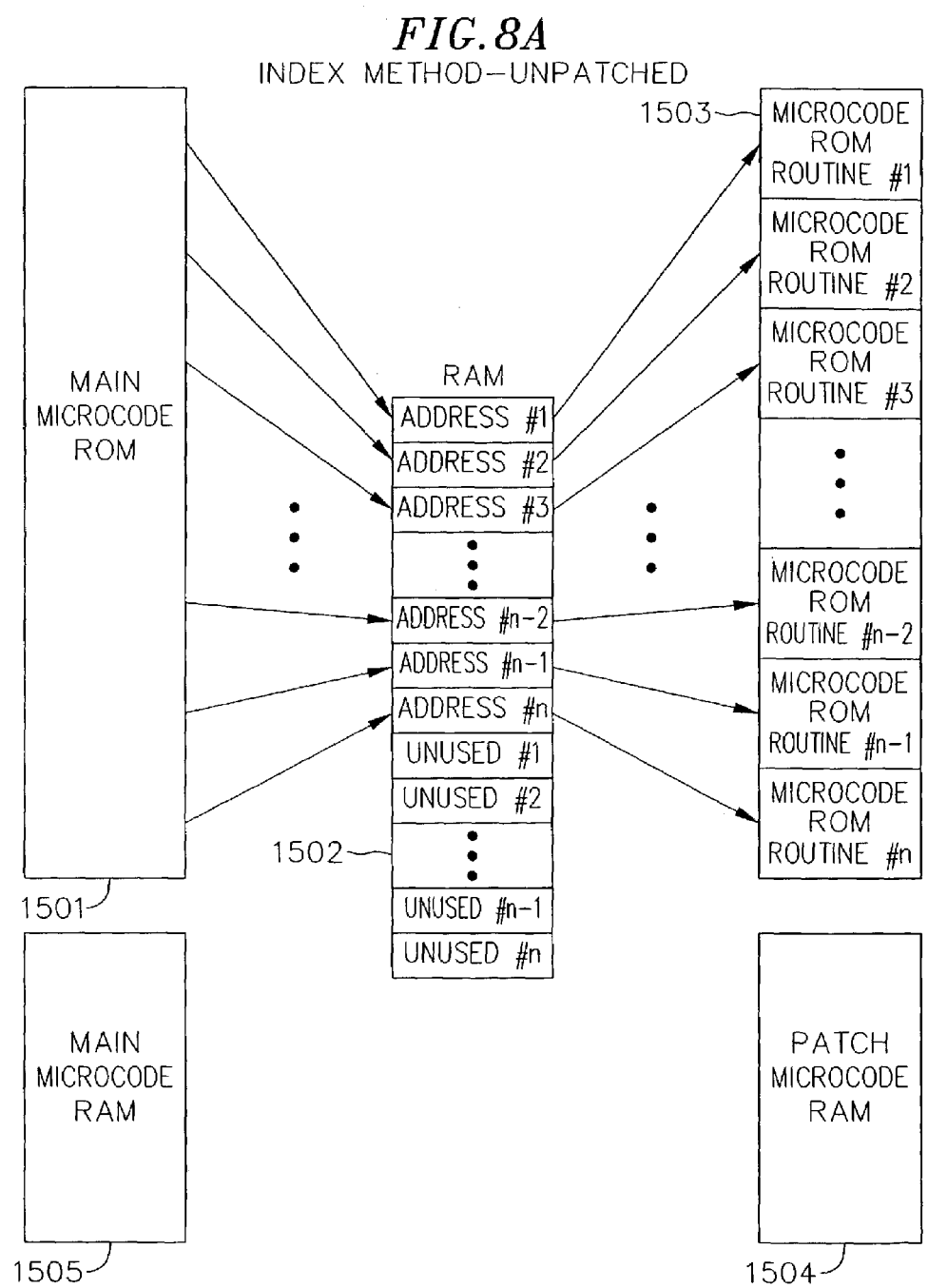
Figure 8C:
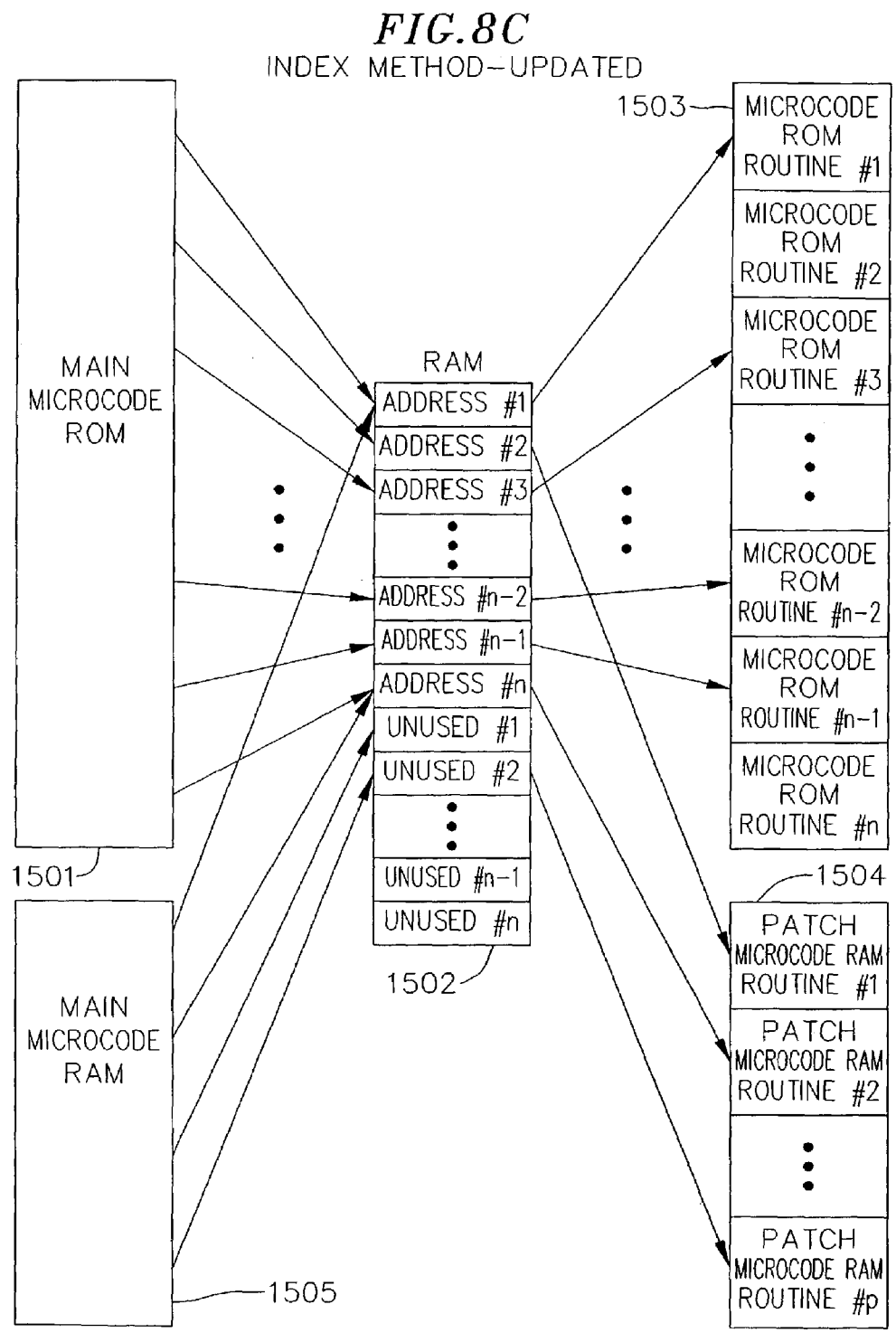
Figure 14:
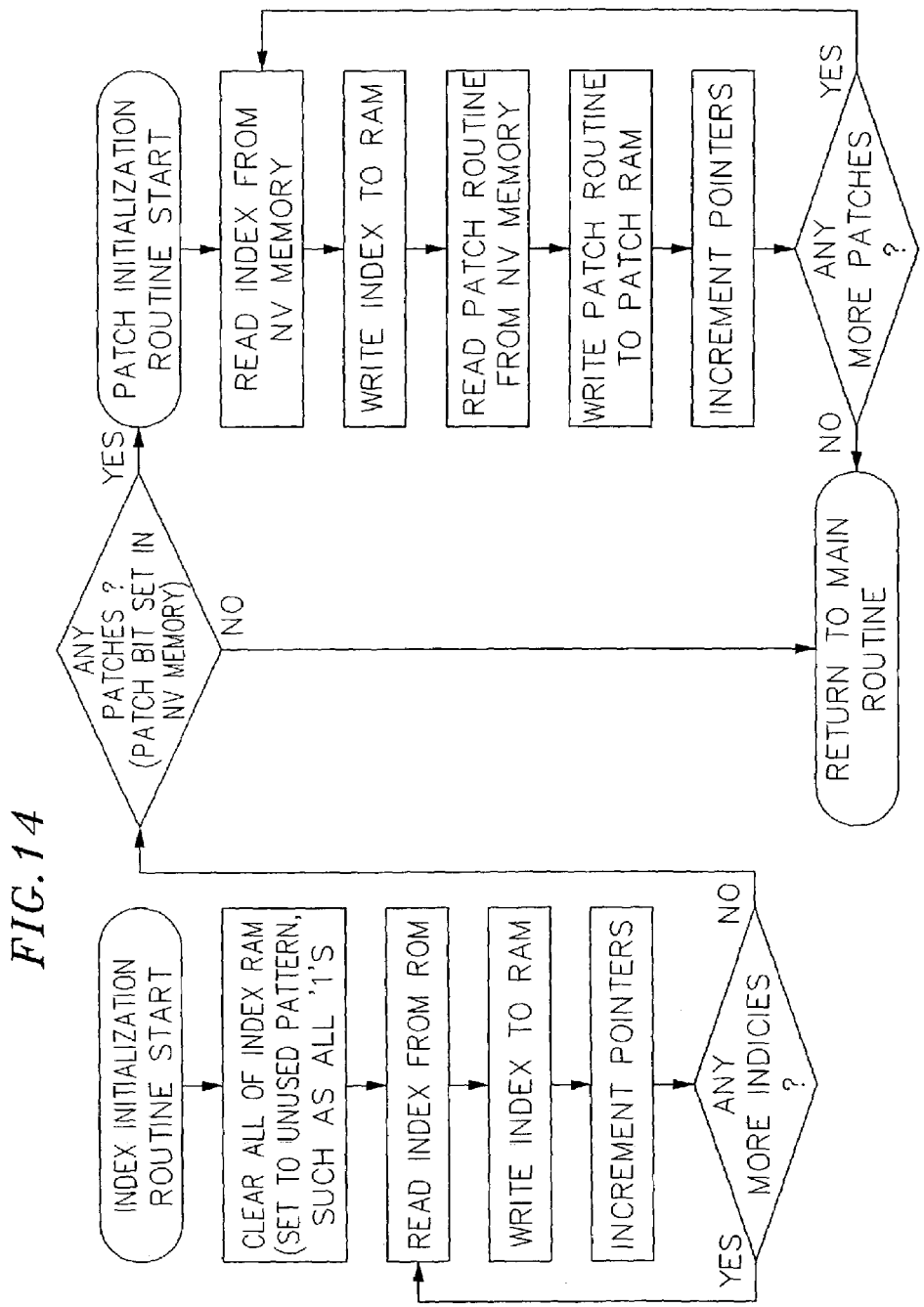
FIG. 14 is a programming flow chart showing a microcode patch initialization routine.

FIGS. 8A through 8C illustrate one embodiment in which a portion of system RAM is used to store the address location for each ROM microcode routine or instruction. The addresses are loaded into RAM when the system is initialized on startup, or when a patch to system ROM microcode is received. FIG. 14 is a logic flowchart for a software routine to load the subject addresses into RAM. When a microcode routine or instruction is to be executed, the system is directed to obtain the microcode address from RAM. As shown in FIG. 8A, if there has been no change or addition to the microcode, the system will be directed to a ROM address, whereupon it will execute the routine or instruction stored in ROM. As illustrated in FIG. 8B, if a patch has been received and loaded in the patch RAM, the applicable RAM address will be substituted for the corresponding ROM instruction address and the routine executed in order from the patch RAM.

Figure 9:
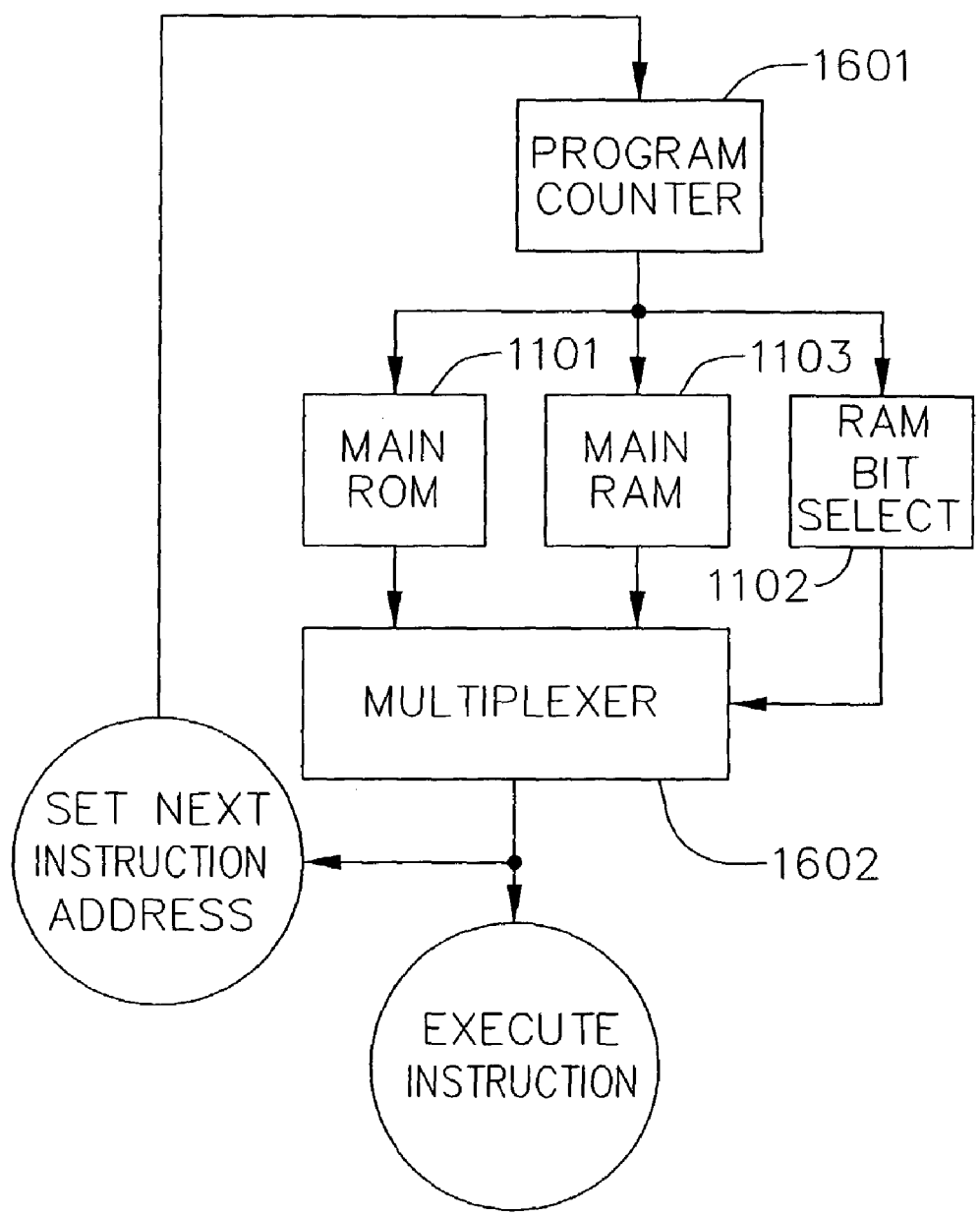
FIG. 9 is a block diagram showing the functional implementation of the memory architecture illustrated in FIG. 4.

FIG. 9 illustrates a system for implementing the memory architecture shown in FIG. 4. To execute a microcode instruction, the program counter (1601) simultaneously addresses main ROM (1101), main RAM (1103), and a RAM select bit (1102). The ROM (1101) microcode and RAM (1103) microcode held in the selected address are input to a multiplexer (1602). The RAM select bit (1102) is used by the multiplexer to control the selection of ROM microcode or RAM microcode as the output of the multiplexer. Depending upon the status of the select bit, the multiplexer selects either the ROM microcode or the RAM microcode for output and further processing. The microcode selected for output from the multiplexer is then executed and the program counter incremented or branched as necessary to initiate the next microcode instruction routine.

Figure 5:
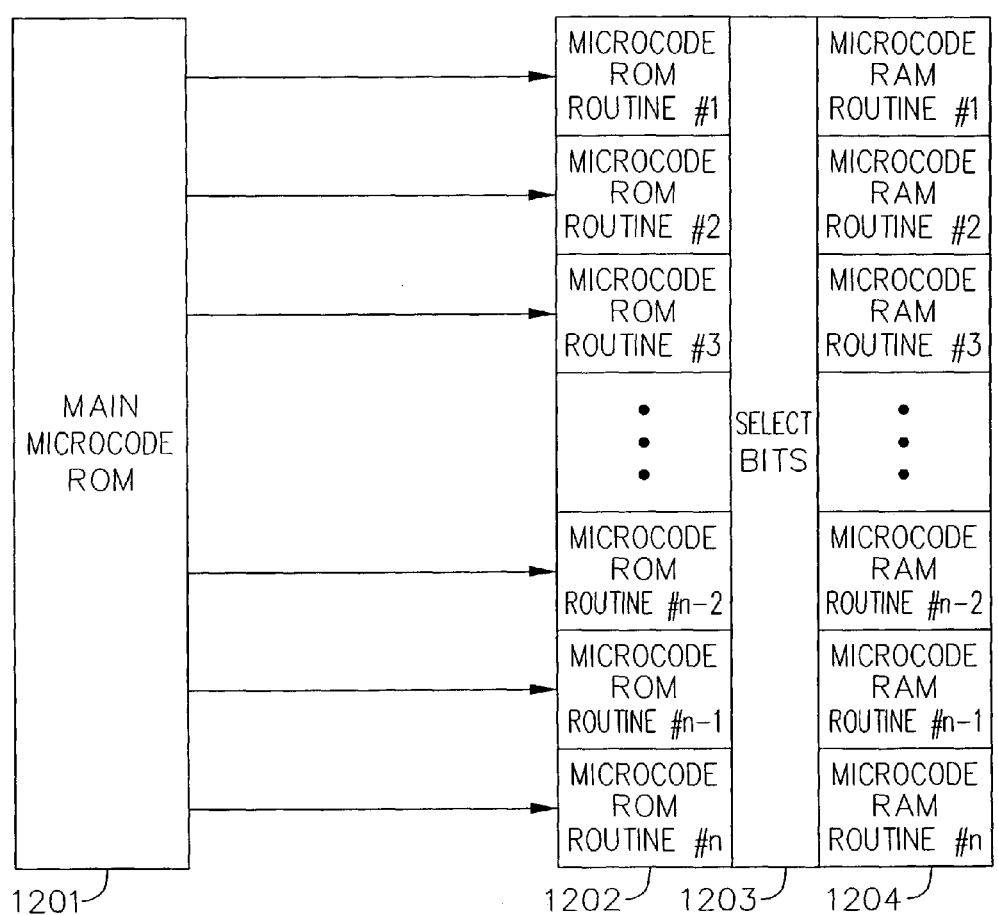
FIG. 5 illustrates a memory architecture in which main microcode ROM is mapped to a common memory address area shared by microcode ROM routines and corresponding microcode RAM routines, along with a "select" RAM bit used to control the selection of microcode ROM routines or microcode RAM routines.
Figure 10:
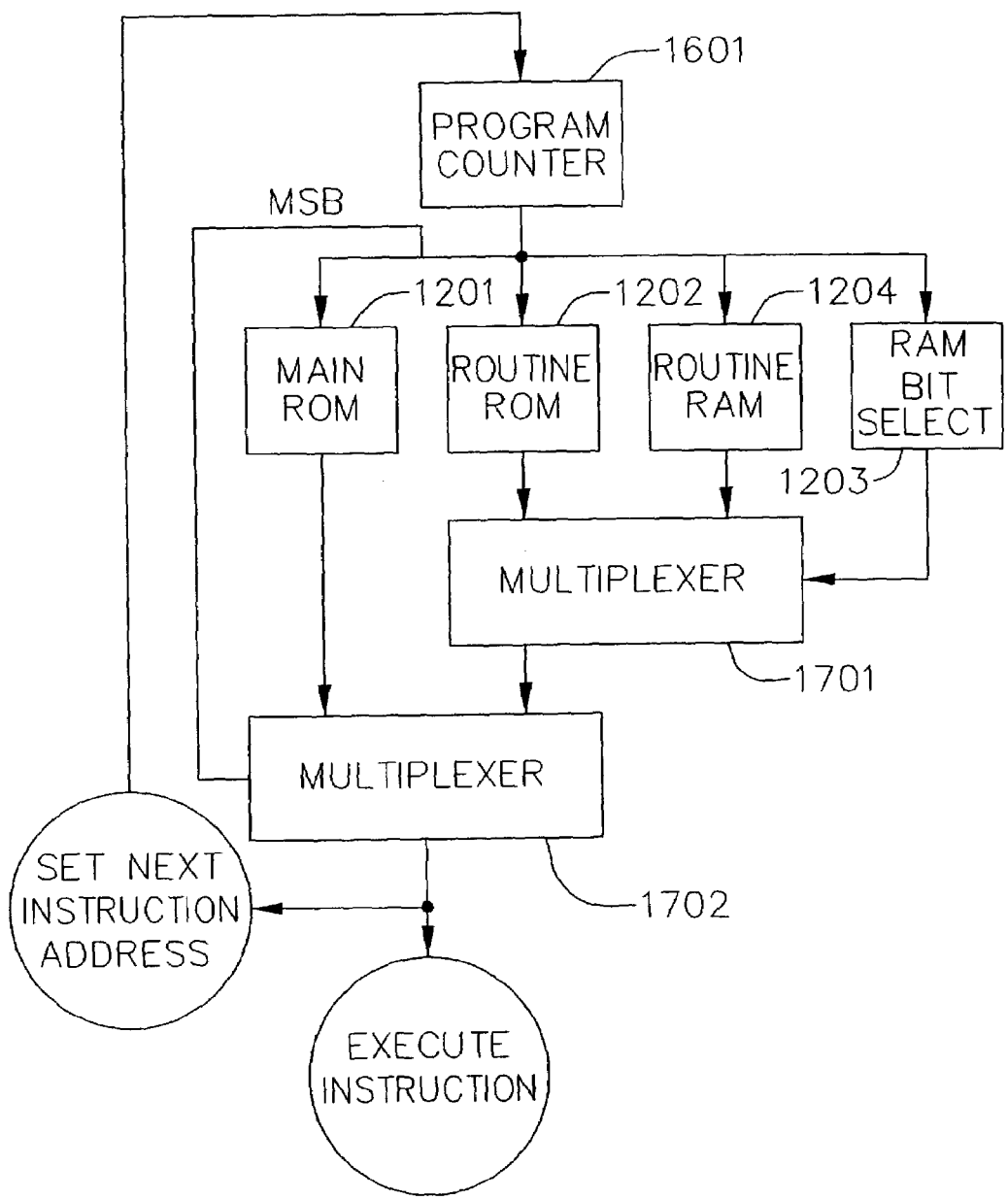
FIG. 10 is a block diagram showing the functional implementation of the memory architecture illustrated in FIG. 5.

FIG. 10 illustrates a system for implementing the memory architecture shown in FIG. 5. Here, the program counter (1601) simultaneously addresses main ROM (1201), routine ROM (1202), routine RAM (1204), and the RAM select bit (1203). The routine ROM (1202) and routine RAM (1204) microcode are input to a multiplexer (1701). The RAM select bit (1203) is used by the multiplexer to control the selection of routine ROM microcode or routine RAM microcode as the output of the multiplexer. Depending upon the status of the select bit, the multiplexer selects either the routine ROM microcode or the routine RAM microcode for output and further processing. The selected output from multiplexer 1701 is input to another multiplexer (1702). Main ROM microcode (1201) is also input to multiplexer 1702. The most significant bit (MSB) or other control bit from the program counter is used to select the output of multiplexer 1702. Depending upon the status of the MSB or other control bit, main ROM microcode or the output of multiplexer 1701 (routine ROM or routine RAM microcode) is selected for output and further processing. The microcode selected for output from multiplexer 1702 is then executed and the program counter incremented or branched as required to initiate the next microcode instruction.

Figure 6A:
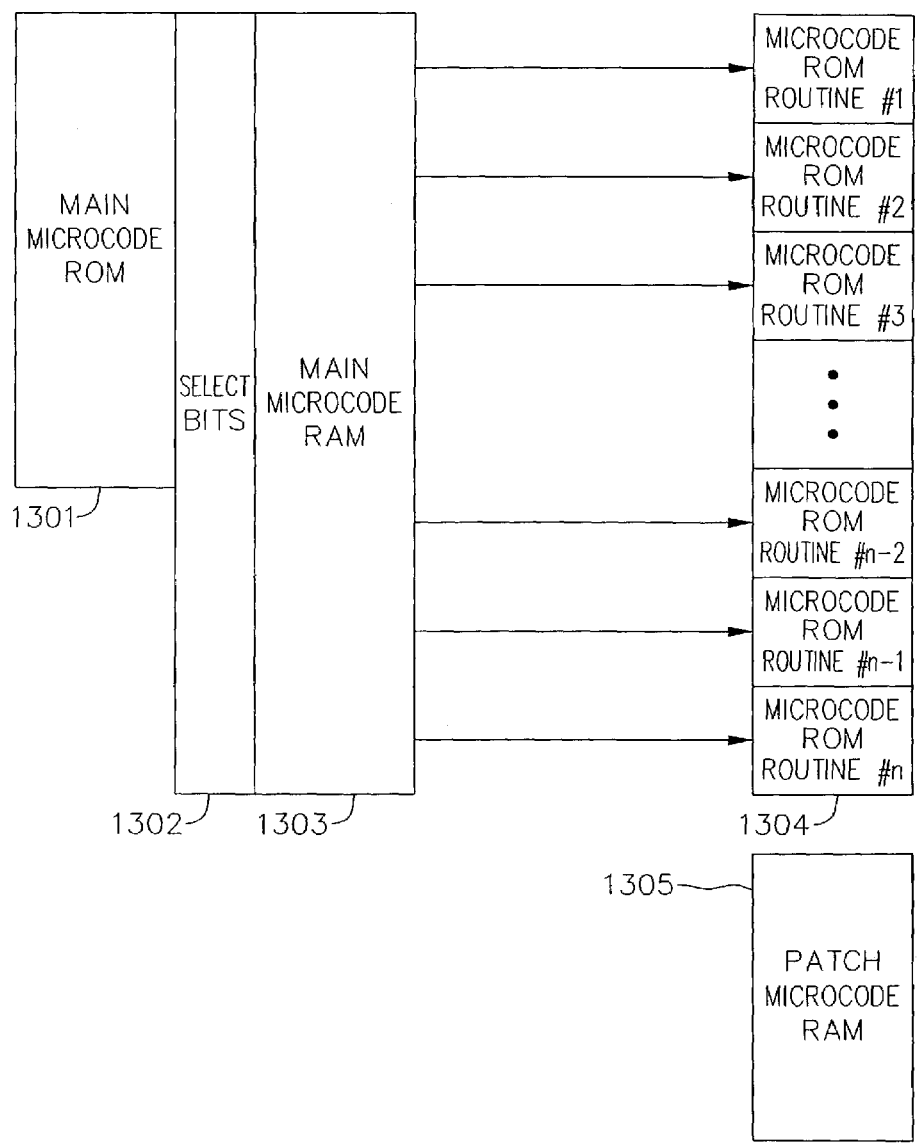
Figure 6B:
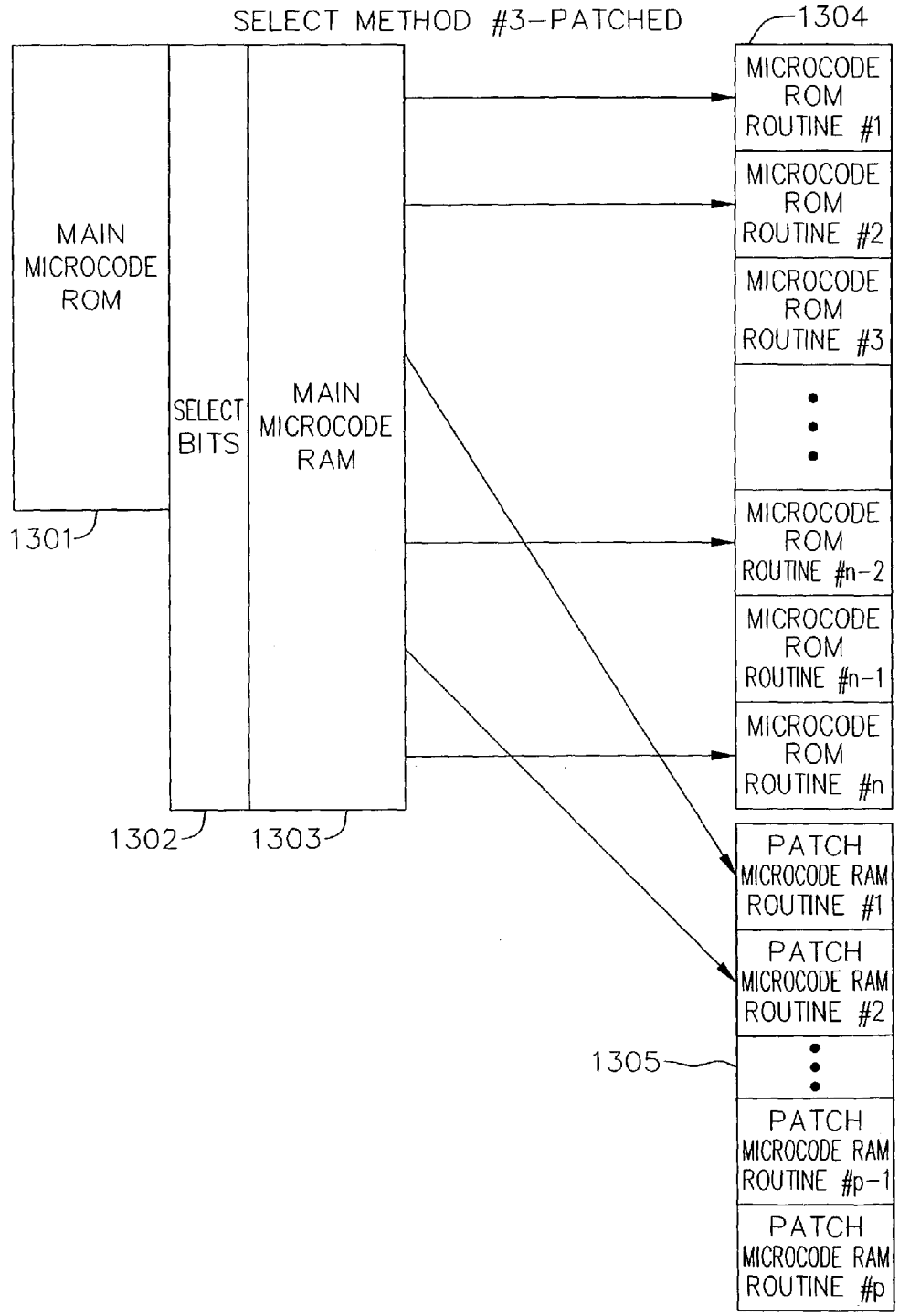
Figure 11:
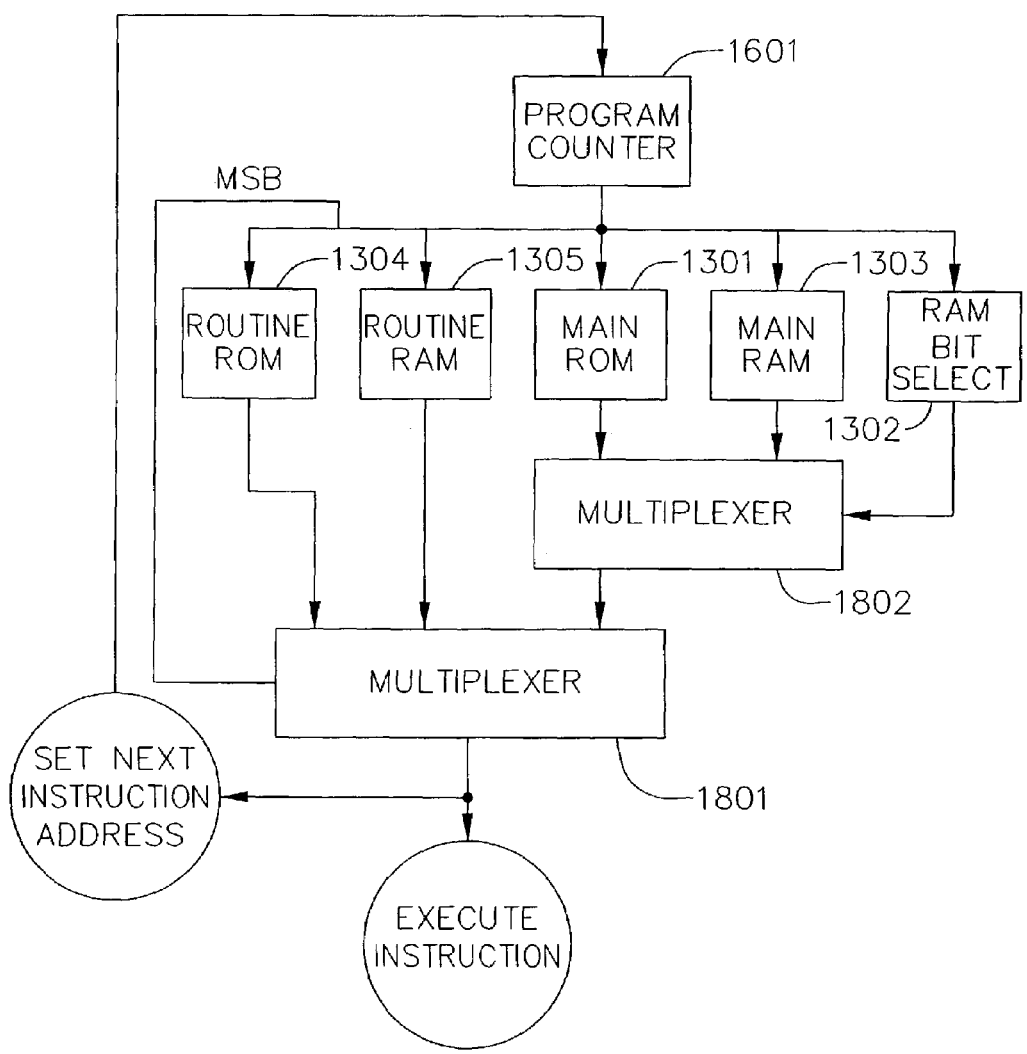
FIG. 11 is a block diagram showing the functional implementation of the memory architecture illustrated in FIGS. 6A, 6B, and 6C.

FIG. 11 illustrates a system for implementing the memory architecture shown in FIGS. 6A, 6B, and 6C. In this case, the program counter (1601) simultaneously addresses main ROM (1301), main RAM (1303), routine ROM (1304), routine RAM (1305), and the RAM select bit (1302). The addressed main ROM microcode and main RAM microcode are used as inputs to multiplexer 1802. The RAM select bit (1302) is used to control the output of multiplexer 1802, either main ROM microcode or main RAM microcode. This output is then directed to multiplexer 1801. Routine ROM microcode (1304) and routine RAM microcode (1305) are also input to multiplexer 1801. The most significant bits (MSB) or other control bits from the program counter are used to select the output of multiplexer 1801. Depending upon the status of the MSBs or other control bits, routine ROM microcode, routine RAM microcode, or the output of multiplexer 1802 (main ROM or main RAM microcode) is selected for output and further processing. The microcode selected for output from multiplexer 1801 is then executed and the program counter incremented or branched as required to initiate the next microcode instruction.

Figure 7A:
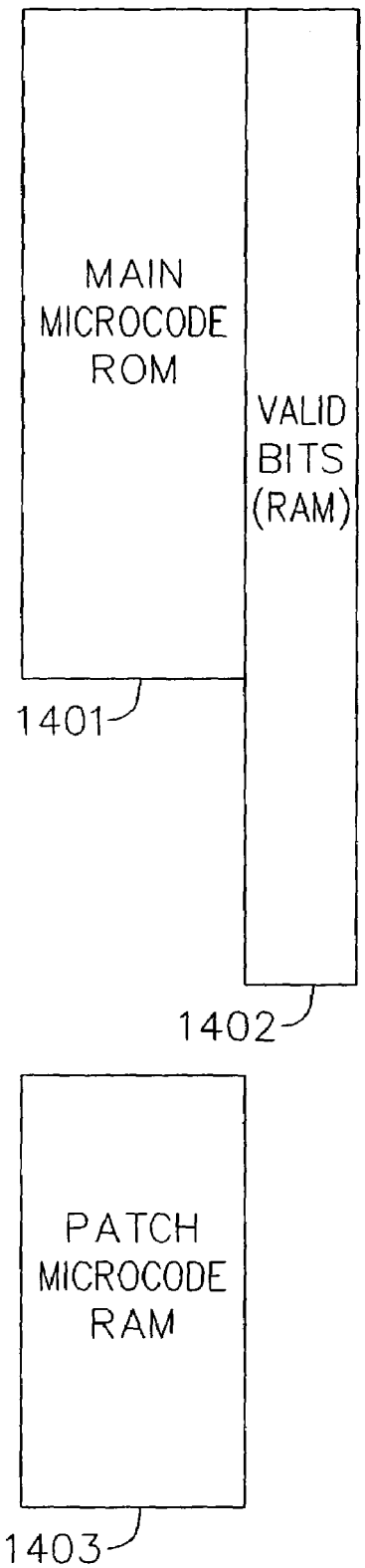
FIGS. 7A, 7B, and 7C illustrate a memory architecture in which a specified RAM bit is used to control the selection of main microcode ROM or patch microcode RAM.
Figure 7B:
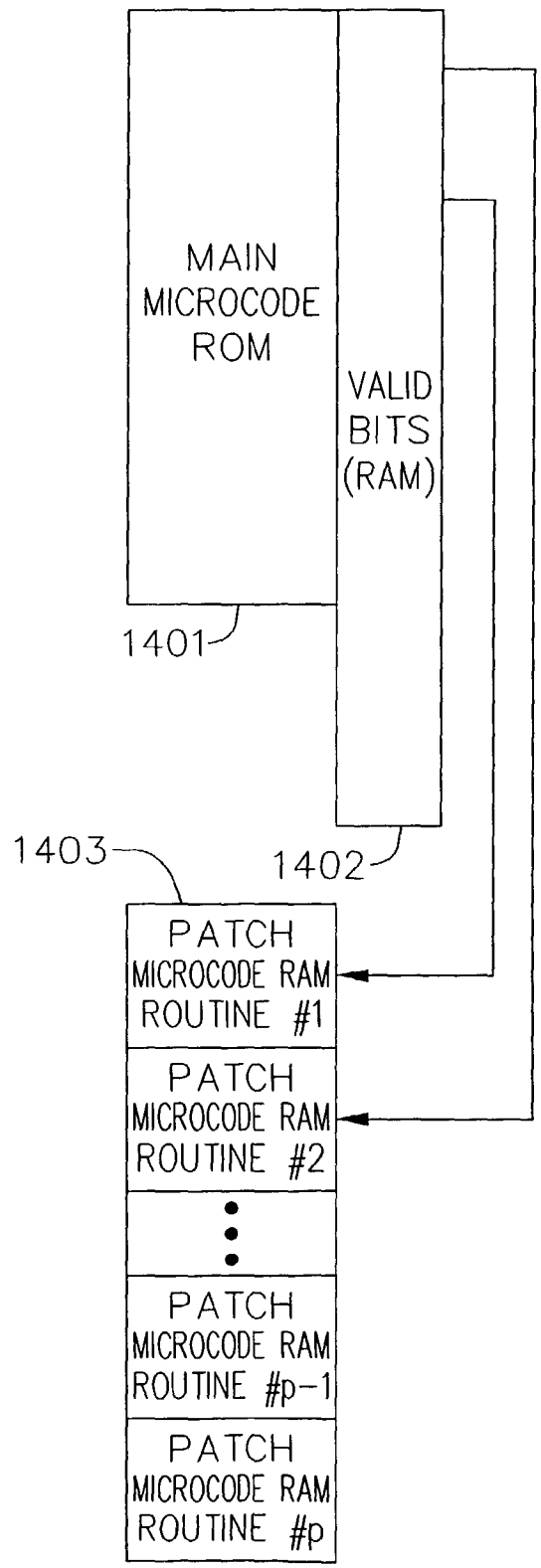
Figure 7C:
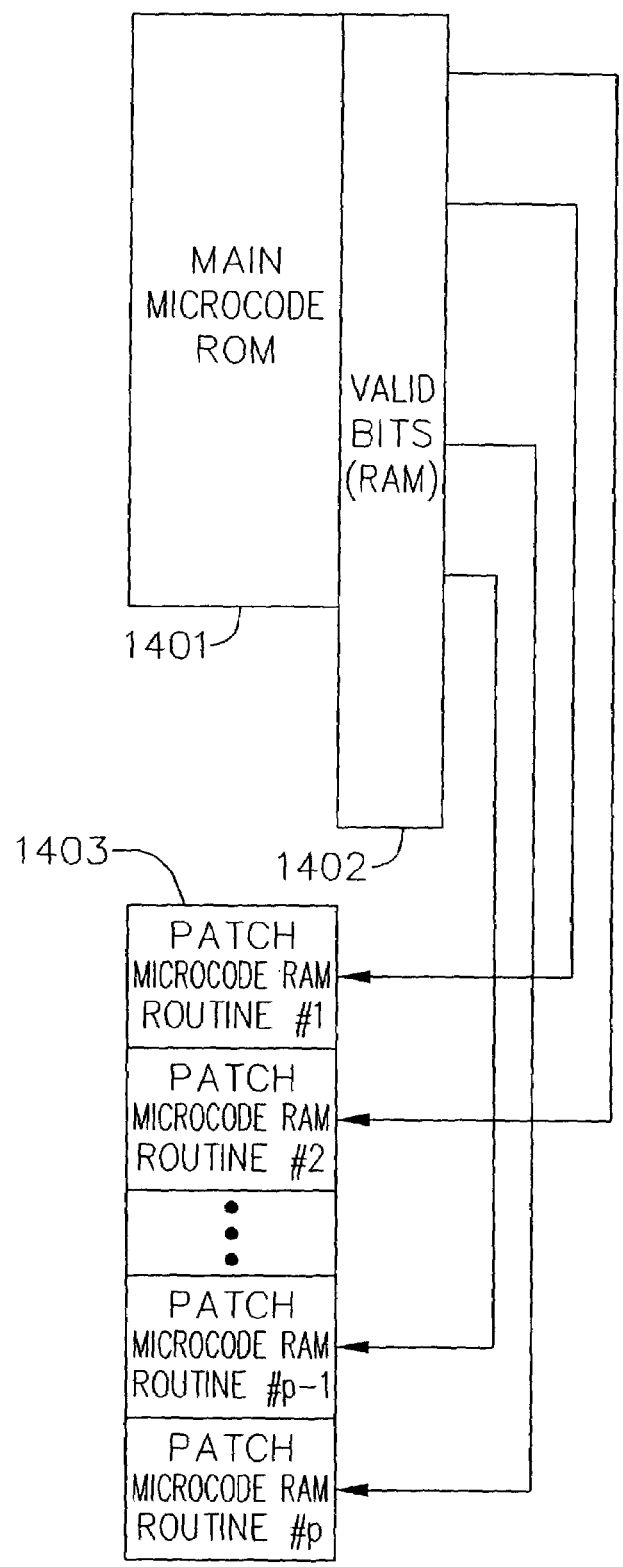
Figure 12:
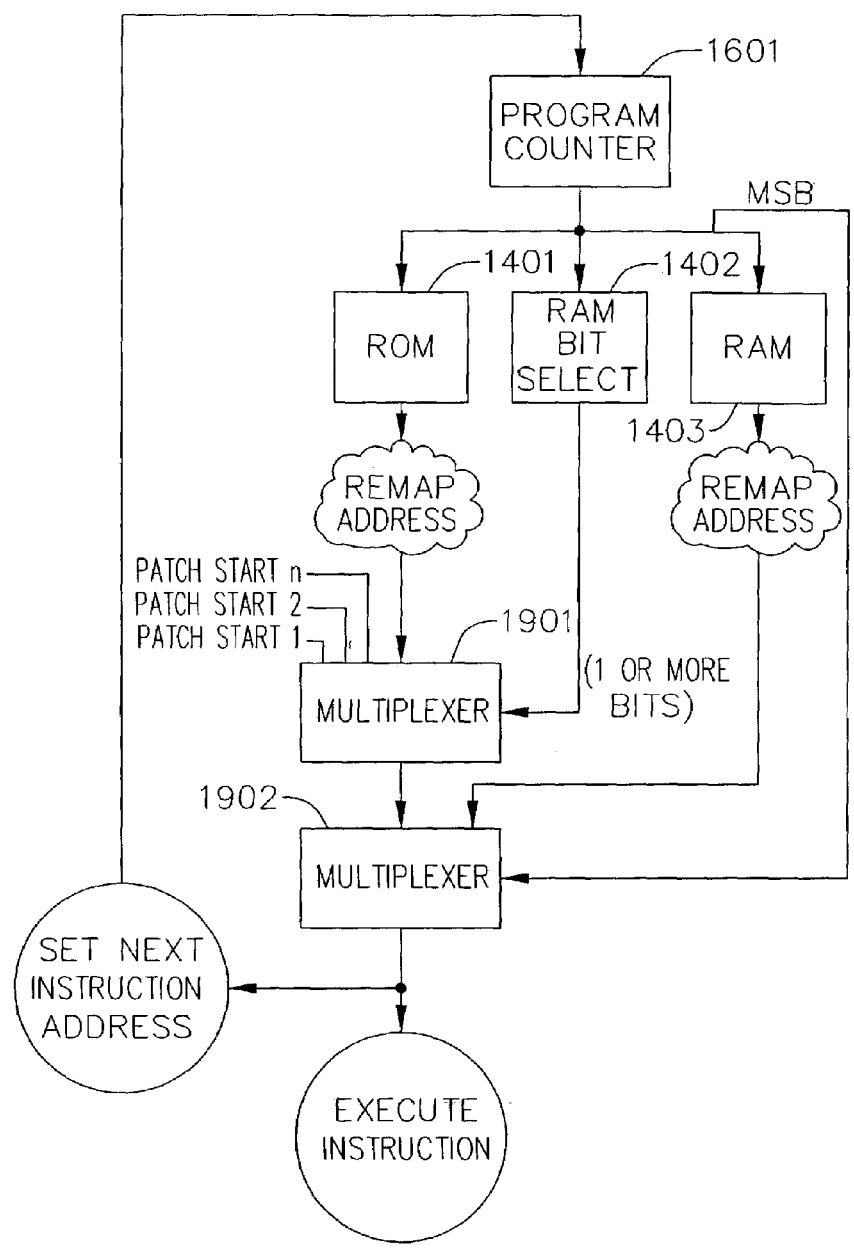
FIG. 12 is a block diagram showing the functional implementation of the memory architecture illustrated in FIGS. 7A, 7B, and 7C.

FIG. 12 illustrates a system for implementing the memory architecture shown in FIGS. 7A, 7B, and 7C. The program counter (1601) simultaneously addresses ROM (1401), RAM (1403), and the RAM select bit (1402). The ROM instruction is re-mapped by a logic circuit and then input to a multiplexer (1901) along with the available RAM patch routines. The routine to be selected is controlled by 1 or more RAM select bits (the number of bits determined by the number of potential patch routines). The selected routine is input to another multiplexer (1902), along with the re-mapped address of RAM instructions (1403). The selection from multiplexer 1902 is controlled by the most significant bit (MSB) of the program counter. The output instruction from multiplexer 1902 is executed and the address for the next instruction determined and forwarded to the program counter.

Figure 13:
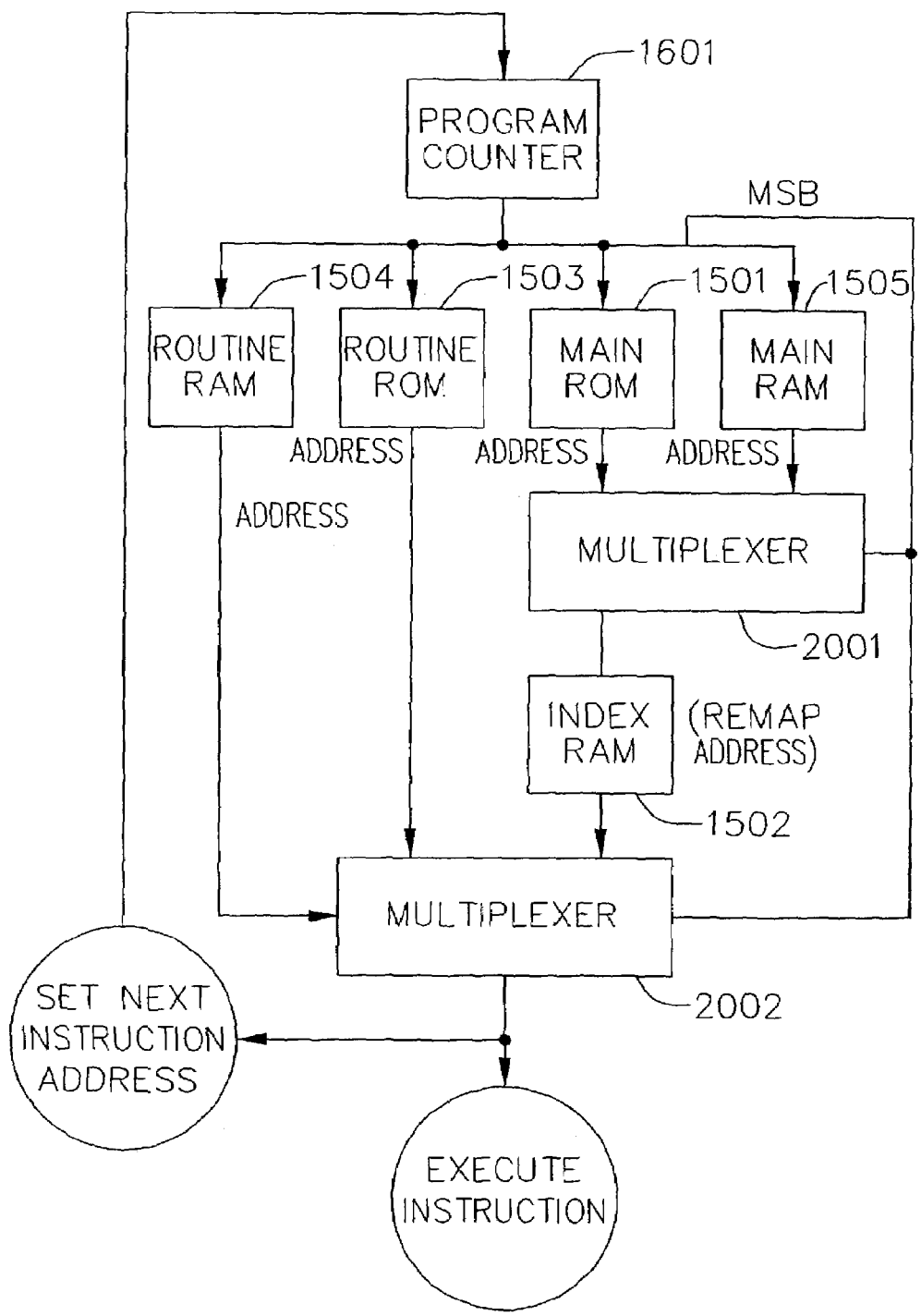
FIG. 13 is a block diagram showing the functional implementation of the memory architecture illustrated in FIGS. 8A, 8B, and 8C.

FIG. 13 illustrates a system for implementing the memory architecture shown in FIGS. 8A, 8B, and 8C. Program counter 1601 simultaneously addresses routine ROM (1503), main ROM (1501), main RAM (1505), and routine RAM (1504). The main RAM and main ROM microcode are used as inputs to multiplexer 2001. The most significant bits (MSB) or other control bits from the program counter are used to select the output of multiplexer 2001. Depending upon the status of the MSBs or other control bits, main ROM microcode or main RAM microcode is selected for output from multiplexer 2001. The selected address is then referenced to the index RAM (1502), remapped as necessary and input to multiplexer 2002. Routine ROM microcode and routine RAM microcode are input to multiplexer 2002. Again, the most significant bit (MSB) or other control bit from the program counter is used to select the output of multiplexer 2002. Depending upon the status of the MSB or other control bit, routine ROM microcode, routine RAM microcode, remapped main RAM or remapped main ROM is selected for output and further processing.

FIG. 14 is a programming flow chart showing a microcode patch initialization routine for the memory architecture depicted in FIGS. 8A, 8B, and 8C. After program initialization, all index RAM locations are set to the unused pattern (such as all "1s"). An index is read from ROM and written to RAM, and pointer incremented to show the next index location. The process is repeated until all indexes are initialized in order. Once the indexes are initialized, the presence of a microcode patch is queried from non-volatile memory by, for example, sampling the status of a designated "patch" bit. If a patch is detected, its index is read from non-volatile memory and written to the corresponding RAM index location. The patch routine is then read from non-volatile memory and written to the designated patch RAM area of memory. The process is repeated until all patches have been indexed and written to RAM. Those skilled in the art will understand that this is only one of many possible programs for loading patched microcode into RAM and indexing its location(s).

As one skilled in the art understands, data processing circuit 302 described above may further comprise a context switching circuit as described in U.S. patent application Ser. No. 09/592,009, filed Jun. 12, 2000, the content of which is incorporated by reference herein in its entirety.

APPENDIX A

```
//*****************************************************
****
***
// RCS HEADER -- DO NOT ERASE
// $Author: johnl $
// $Id: demod.v,v 1.12 2000/05/30 20:59:21 johnl Exp johnl $
// Pivotal Technologies
//*****************************************************
****
***

`define SPB 32
`define CTR 5
`define THR 10   // `THR defines the precision
`define TRK 2    // `TRK defines tracking speed
`define LIN 1
`define PREC 10 module demod(reset,clk,start,ip,qp,nrz,sclk);
input reset,clk;  // this is 32 MHz clock
input ip,qp; // from RF
input start;      // slot start indication from bluetooth clock
output nrz;  // extracted bit to elasticity buffer
output sclk; // write pulse to elasticity buffer wire sample, cross;
wire dec;       // decision
reg prev_dec;

// the magic formula for arc tan
reg ip_reg, qp_reg;
```

```verilog
reg [0:`SPB -1] i_buffer, q_buffer;

always @(posedge clk or posedge reset)
  begin
  if (reset | start)
    begin
    ip_reg <= 1'b0;
    qp_reg <= 1'b0;
    i_buffer <= `SPB'd0;
    q_buffer <= `SPB'd0;
    end
  else
    begin
    ip_reg <= ip;
    qp_reg <= qp;
    i_buffer <= {ip_reg, i_buffer[0:`SPB -2]};
    q_buffer <= {qp_reg, q_buffer[0:`SPB -2]};
    end
  end // for iq or qi, 1 is 1, 0 is -1
wire iq = ~(i_buffer[`SPB -1]^qp_reg);   // i(t-T)*q(t)
wire qi = ~(q_buffer[`SPB -1]^ip_reg);   // q(t-T)*i(t)
wire [`CTR +1:0] y2_big;    // range from -32 to 32, the integration
result of s_demod2

//running_avg_filter ifilter (
butterworth_filter ifilter(
    .reset(reset),
    .clk(clk),
    .iq(iq),
    .qi(qi),
```

```
    .start(start),
    .y2_big(y2_big)
);

// dc tracking
reg [`THR +`CTR +1:0] th_max; wire [`CTR +1:0] th_max2 = th_max
[`THR +`CTR +1:`THR];
reg [`THR +`CTR +1:0] th_min; wire [`CTR +1:0] th_min2 = th_min
[`THR +`CTR +1:`THR];
wire [`THR +`CTR +2:0] thresholdx2 = { th_max[`THR + `CTR +1],
th_max } +
                                    { th_min[`THR + `CTR +1],
th_min };
wire [`THR + `CTR +1:0] threshold = thresholdx2[`THR +`CTR +2:1];
wire [`CTR +1:0] thres2 = threshold[`THR +`CTR +1:`THR];

wire [3 +`THR +`CTR +1:0] threshold_div8 = { {3{threshold[`THR
+`CTR +1]}}, threshold[`THR +`CTR +1:0] };
wire [3 +`THR +`CTR +1:0] y2_big_div8      = { {3{y2_big[`CTR
+1]}},
y2_big[`CTR +1:0], `THR'd0 };
wire [`TRK +`THR +`CTR +1:0] y2_big_divved   = {
{`TRK{y2_big[`CTR +1]}}, y2_big[`CTR :1:0], `THR'd0 };
wire [`TRK +`THR +`CTR +1:0] th_max_divved   = {
{`TRK{th_max[`THR +`CTR +1]}}, th_max[`THR +`CTR +1:0] };
wire [`TRK +`THR +`CTR +1:0] th_min_divved   = {
{`TRK{th_min[`THR +`CTR +1]}}, th_min[`THR +`CTR +1:0] };
wire [`CTR +1:0] linear_max = thres2 + `LIN;
wire [`CTR +1:0] linear_min = thres2 - `LIN;

// baud tracking
// clipped at 1/8 (32 * 2 / 8 = 8)
wire [`CTR +2:0] delta = {y2_big[`CTR +1],y2_big} - {thres2[`CTR
```

```
+1],thres2};

wire [`CTR +1:0] clipped_delta = (delta <= 4)               ?
delta :
                                 (delta < {1'b1,1'b0,`CTR'd0}) ? 4
:
                      (delta < -4)                  ? -4 :
                                                        delta;

reg [4:0] start_counter;

always @(posedge reset or posedge clk)
  begin
  if (reset)
    begin
    start_counter = 5'd0;
    th_max = {2'd0,`CTR'd0,`THR'd0};
    th_min = {2'd0,`CTR'd0,`THR'd0};
    end
  else if (start)
    begin
    start_counter = 5'h1F;
    th_max = {2'd0,`CTR'd0,`THR'd0};
    th_min = {2'd0,`CTR'd0,`THR'd0};
    end
  else if (sample)  // start of packet, adjusting to carrier
    begin
    if (start_counter > 0)
      begin
      start_counter = start_counter -1;
      th_min = th_min - threshold_div8[3 +`THR +`CTR +1:3];
      th_min = th_min +   y2_big_div8[3 +`THR +`CTR +1:3];
      th_max = th_min;
```

```
                            //    { {3{y2_big[`CTR +1]}},
y2_big[`CTR +1:0],3'd0};
                            //+ ~{ {3{threshold[`THR +`CTR +1]}},
threshold[`THR +`CTR +1:`THR_3]} + 1;
            end
        else if ( dec && !prev_dec)       // steady state
            begin
            th_max = th_max - th_max_divved[`TRK +`THR +`CTR +1: `TRK];
            th_max = th_max + y2_big_divved[`TRK +`THR +`CTR +1: `TRK];
            end
        else if (!dec && prev_dec)
            begin
            th_min = th_min - th_min_divved[`TRK +`THR +`CTR +1: `TRK];
                th_min = th_min + y2_big_divved[`TRK +`THR +`CTR +1:
`TRK];
            end
        end
    end // decision
wire raw_dec = ~delta[`CTR +2];
wire [`CTR +2:0] overlinear = `LIN - delta;
wire [`CTR +2:0] underlinear = delta +`LIN;

wire in_linear = raw_dec ? ~overlinear[`CTR +2] :
~underlinear[`CTR +2];
//wire in_linear = 1'b0;
assign dec = in_linear ? ~prev_dec : raw_dec;

// phase adjustment
// maximum adjustment is 16, minimum adjustment is 0.5
// crossing value of 1 cause adjustment of 0.5
// crossing value of >=32 cause adjustment of 16
```

```
reg [`CTR +1:0] phase;    // can be more than 32 later, depend on
adjustment
                          // phase[0] is below decimal
reg  [`CTR +1:0] crossing_value;   // [-32 ,32]
wire [`CTR +1:0] adjustment =
              (prev_dec == dec)  ? {2'd0,`CTR'd0} : // flat
              (prev_dec == 1'b1) ? crossing_value : // downward
                                   ~crossing_value + 1; // upward assign sample = (phase[`CTR +1:1] == 0)  ? 1'b1 : 1'b0;
assign cross  = (phase[`CTR +1:1] == 16) ? 1'b1 : 1'b0;

// phase update and adjustment
always @(posedge clk or posedge reset)
  begin
  if (reset)
    begin
    phase = {1'b0, ~{`CTR'd0}, 1'b0};  // default 31.0
    prev_dec = 1'b0;
    end
  else if (sample)
    begin
    phase = {1'b0, ~{`CTR'd0}, phase [0]};  // keep the fraction
    phase = phase + adjustment;
    prev_dec = dec;
    end
  else
    phase[`CTR +1:1] = phase[`CTR +1:1]-1;
  end always @(posedge clk or posedge reset)
  begin
  if (reset)
```

```verilog
        crossing_value <= {2'd0, `CTR'd0};
    else if (cross)
        crossing_value <= clipped_delta;
    end wire baud = dec;
wire valid = sample;
reg nrz;
reg [4:0] sclk_counter;

always @(posedge clk or posedge reset)
    begin
    if (reset)
        begin
        nrz <= 1'b0;
        sclk_counter <= 5'd0;
        end
    else if (valid)
        begin
        nrz <= baud;
        sclk_counter <= 5'd0;
        end
    else if (sclk_counter < 31)
        sclk_counter <= sclk_counter + 1;
    else;
    end assign sclk = sclk_counter[4];

endmodule

// running average of demod, y2_big
module running_avg_filter(reset,clk,iq,qi,Y2_big,start);
```

```verilog
input reset, clk, iq,qi;
input start;
output [`CTR +1:0] y2_big;   // range from -32 to 32, the
integration result of s_demod2

// only allow 00, 01, 10.  11 is the same as 00
wire [0:1] s_demod2 = {iq,qi};
reg [0:`SPB -1] y2_i, y2_qi;

always @(posedge clk or posedge reset)
  begin
  if (reset | start)
    begin
    y2_i <= `SPB'd0;
    y2_q <= `SPB'd0;
    end
  else
    begin
    y2_i <= {s_demod2[0],y2_i[0:`SPB -2]};
    y2_q <= {s_demod2[1],y2_q[0:`SPB -2]};
    end
  end reg [`CTR +1:0] y2_big;   // range from -32 to 32, the integration
result of s_demod2
always @(posedge clk or posedge reset)
  begin
  if (reset | start)
    y2_big = {2'd0, `CTR'd0};
  else
    begin
    if (y2_i[31])
      y2_big = y2_big -1;   // remove a +1
```

```
    if (y2_q[31])
      y2_big = y2_big +1;    // remove a -1
    if (s_demod2[0])
      y2_big = y2_big _1;    // add a +1
    if (s_demod2[1])
      y2_big = y2_big -1;    // add a -1
    end
  end endmodule module butterworth_filter(reset,clk,iq,qi,y2_big,start);
input start;
input reset, clk;
input iq;   // add a +1
input qi;   // add a -1
output [`CTR +1:0] y2_big;

// this implements:
//    y(n) = x(n) + 2*x(n-1) + x(n-2) - ( -1.8613*y(n-1) +
0.8691*y(n-2) )
// where y = BX - AY // x input delay chain reg [1:2] iqt, qit;
always @(posedge reset or posedge clk)
  begin
  if (reset)
    begin
    iqt <= 2'd0;
    qit <= 2'd0;
    end
```

```
    else
      begin
      iqt <= {iq,iqt[1]};
      qit <= {qi,qit[1]};
      end
  end // sum up the BX
reg [3:0] bx;
always @(iq or qi or iqt or qit)
  begin
  bx = 0;
  if (iq) bx = bx + 1;
  if (qi) bx = bx - 1;
  if (iqt[1]) bx = bx + 2;
  if (qit[1]) bx = bx - 2;
  if (iqt[2]) bx = bx + 1;
  if (qit[2]) bx = bx - 1;
  end reg [`PREC + 9:0] y1,y2;

// sos5 = -1906/1024,
// sos6 =   890/1024

// product of y1 & sos5
wire [11 +`PREC + 9 :0] signed_y1 = { {11{y1[`PREC +9]}}, y1};
wire [22 +`PREC + `PREC + 19 :0] product_y1_sos5 = signed_y1 *
1906;
wire [11 +`PREC + 9 :0] y1_sos5_1k = product_y1-sos5;    // still
need to divide by 1024
wire [`PREC + 10:0] y1_sos5 = y1_sos5_1k[11 +`PREC + 9 :10];
```

```verilog
// product of y2 & sos6
wire [11 +`PREC + 9 :0] signed_y2 = { {11{y2[`PREC +9]}}, y2};
wire [22 +`PREC + `PREC + 19 :0] product_y2_sos6 = signed_y2 * 890;
wire [11 +`PREC + 9 :0] y2_sos6_1k = product_y2_sos6;  // still need to divide by 1024
wire [`PREC + 10:0] y2_sos6 = y2_sos6_1k[11 +`PREC + 9 :10];

// sum up AY
wire [`PREC + 11:0] ay = {y2_sos6[`PREC +10],y2_sos6} -
{y1_sos5[`PREC +10],y1_sos5};

// y = BX - AY
wire [`PREC + 12:0] ext_y = {{19{bx[3]}},bx} - {ay[`PREC +11],ay};
wire [`PREC + 9:0} y = {ext_y[`PREC +12], ext_y[`PREC + 8:0]};

always @(posedge reset or posedge clk)
  if (reset || start)
    begin
    y1 <= 0;
    y2 <= 0;
    end
  else
    begin
    y1 <= y;
    y2 <= y1;
    end assign y2_big = y1[10: 10 - `CTR -1];

endmodule
```

APPENDIX B

```c
#include <assert.h>
#include <iostream.h>
#include <math.h>
#include <stdlib.h>
include <stdio.h> include <list> include <sys/time.h> include "util.h"

include "rx_simple.h"
#include "rx_ma.h"
#include "rx_hma.h"
#include "rx_ell.h"
#include "rx_ella.h"
#include "rx_ellb.h"

define CONST const double ebn0=25.0;            /* dB */

CONST int nbits=1000000;         /* number of bits to
                                    produce
*/

CONST double pc=1.0;             /* carrier power, Watts */

CONST double fif=1.0e6;          /* intermediate frequency
                                  */
```

```
double foff=1*150e3;            /* static frequency offset */
CONST double fs=16e6;           /* sampling rate */
double fdev=140e3;              /* fm deviation, 140-175
                                   kHz
*/

CONST double fbit=1e6;          /* data rate */
double tbit;                    /* baud interval */
int spb;                        /* samples per bit */

CONST double btbit=0.5;         /* gfsk duration-bw
                                   product */
double b;                       /* gaussian filter bandwidth */ double fmaxdrift=1*0.5*40e3;    /* maximum drift amplitude
                                   */
CONST double fdriftrate=400e6;  /* maximum drift rate,
400 Hz/us */
CONST double trefractory=10e-6; /* refractory-period
between chirps */ double tdrift;                  /* chirp waveform period
                                   */
double fdrift;                  /* chirp waveform
                                   frequency */
double adrift;                  /* chirp waveform
                                   "amplitude"
(Hz) */

CONST int skipbits=100;         /* initial bits to skip */
CONST int flushbits=10;         /* final bits for flushing
filters */
CONST int syncbits=4;           /* alternating bits after
```

```
carrier */
CONST int carrierbits=4;          /length of pure carrier in
                                  bits */

CONST double cphase0=0.0;         /* initial carrier phase,
(2*PI) */
double cphase;
double dcphase;

double mphase;                    /* message integral */
double mphase_scale;              /* scales message to radians
*/ double chirpfphase;               /* chirp  frequency nco
                                  phase
(rad) */
double dchirpfphase;

double chirpphase;                /* (2*PI) */
double chirpphase_scale;

double ampscale;
double noisescale;

int ip_z=0;
int qp_z=0;

int det_z=0;
int det_zz=0;

double stage1_z=0;
double stage1_zz=0;
```

```
double stage2_z=0;
double stage2_zz=0;

//long randseed=954924254;   // ella fails bigtime
long randseed=955132310;      // ella fails
//long randseed=0;

bitbuffer truebits;
list<rxinfo> rxlist;

/* initialize set up simulation globals

*/ void initialize(void) { if (randseed==0) { struct timeval tv;

gettimeofday(&tv, NULL);
    randseed=tv.tv_sec^tv.tv_usec;

} cout << "seed: " << randseed << endl ;

srand48(randseed);
  srand(randseed);
```

```
tbit=1.0/fbit;
b=btbit/tbit;

spb=(int)floor(fs/fbit);        /* MUST BE INTEGER */ tdrift=4*fmaxdrift/fdriftrate+2*trefractory;
fdrift=1.0/tdrift;
adrift=fmaxdrift+fdriftrate*trefractory/2.0;

cphase = 2*PI*( cphase0<0.0 ? drand48() : cphase0 );
dcphase = 2*PI*(fif+foff)/fs ;

mphase=0.0;
mphase_scale=2*PI*fdev/fs;

chirpfphase=0.0;
dchirpfphase=2*PI*fdrift/fs;

chirpphase=0.0;
chirpphase_scale=2*PI/fs;

#if 0
  ampscale=sqrt(pc);
  noisescale=sqrt(pow(10.0, -ebn0/10.0)*pc*tbit*fs/2.0);
#else
  ampscale=1.0;
  noisescale=0.1590541458;
endif printf("noisescale %.10g\n", noisescale);
  //register_rx(rxlist, new rx_simple(16, 0), "RX0");
  //register_rx(rxlist, new rx_simple(16, 1), "RX1");
  //register_rx(rxlist, new rx_simple(16, 2), "RX2");
```

```
//register_rx(rxlist, new rx_simple(16, 3), "RX3");
//register_rx(rxlist, new rx_simple(16, 4), "RX4");
//register_rx(rxlist, new rx_simple(16, 5), "RX5");
register_rx(rxlist, new rx_simple(16, 6), "RX6");
register_rx(rxlist, new rx_simple(16, 7), "RX7");
register_rx(rxlist, new rx_simple(16, 8), "RX8");
//register_rx(rxlist, new rx_simple(16, 9), "RX9");
//register_rx(rxlist, new rx_simple(16, 10), "RX10");
//register_rx(rxlist, new rx_simple(16, 11), "RX11");
//register_rx(rxlist, new rx_simple(16, 12), "RX12");
//register_rx(rxlist, new rx_simple(16, 13), "RX13");
//register_rx(rxlist, new rx_simple(16, 14), "RXI4");
//register_rx(rxlist, new rx_simple(16, 15), "RX15");

register_rx(rxlist, new rx_ma(16, 0), "MRX0");
//register_rx(rxlist, new rx_ma(16, 1), "MRX1");
//register_rx(rxlist, new rx_ma(16, 2), "MRX2");
//register_rx(rxlist, new rx_ma(16, 3), "MRX3");
//register_rx(rxlist, new rx_ma(16, 4), "MRX4");
//register_rx(rxlist, new rx_ma(16, 5), "MRX5");
//register_rx(rxlist, new rx_ma(16, 6), "MRX6");
//register_rx(rxlist, new rx_ma(16, 7), "MRX7");
//register_rx(rxlist, new rx_ma(16, 8), "MRX8");
//register_rx(rxlist, new rx_ma(16, 9), "MRX9");
//register_rx(rxlist, new rx_ma(16, 10), "MRX10");
//register_rx(rxlist, new rx_ma(16, 11), "MRX11");
//register_rx(rxlist, new rx_ma(16, 12), "MRX12");
//register_rx(rxlist, new rx_ma(16, 13), "MRX13");
register_rx(rxlist, new rx_ma(16, 14), "MRX14");
register_rx(rxlist, new rx_ma(16, 15), "MRX15");

register_rx(rxlist, new rx_hma(16, 0), "HMRX0");
//register_rx(rxlist, new rx_hma(16, 1), "HMRX1");
```

```
//register_rx(rxlist, new rx_hma(16, 2), "HMRX2");
//register_rx(rxlist, new rx_hma(16, 3), "HMRX3");
//register_rx(rxlist, new rx_hma(16, 4), "HMRX4");
//register_rx(rxlist, new rx_hma(16, 5), "HMRX5");
//register_rx(rxlist, new rx_hma(16, 6), "HMRX6");
//register_rx(rxlist, new rx_hma(16, 7), "HMRX7");
//register_rx(rxlist, new rx_hma(16, 8), "HMRX8");
//register_rx(rxlist, new rx_hma(16, 9), "HMRX9");
//register_rx(rxlist, new rx_hma(16, 10), "HMRX10");
//register_rx(rxlist, new rx_hma(16, 11), "HMRX11");
//register_rx(rxlist, new rx_hma(16, 12), "HMRX12");
//register_rx(rxlist, new rx_hma(16, 13), "HMRX13");
 register_rx(rxlist, new rx_hma(16, 14), "HMRX14");
 register_rx(rxlist, new rx_hma(16, 15), "HMRX15");

register_rx(rxlist, new rx_el1(16, 0), "EL1");
 register_rx(rxlist, new rx_el1a(16, 0, carrierbits*spb, 16, 2),
"EL1A(16,2)");
 register_rx(rxlist, new rx_el1a(16, 0, carrierbits*spb, 16,
1.5), "EL1A(16,1.5)");
 register_rx(rxlist, new rx_el1a(16, 0, carrierbits*spb, 16, 1),
"EL1A(16,1)");
 register_rx(rxlist, new rx_el1a(16, 0, carrierbits*spb, 8, 2),
"EL1A(8,2)");
 register_rx(rxlist, new rx_el1a(16, 0, carrierbits*spb, 8, 1.5),
"EL1A(8,1.5)");
 register_rx(rxlist, new rx_el1a(16, 0, carrierbits*spb, 8, 1),
"EL1A(8,1)");

//register_rx(rxlist, new rx_el1b(16, 7, carrierbits*spb, 4,
1.5, "EL1B.dat"), "EL1B");

}
```

```
/* gfilter 33-tap gaussian pulse shaping filter

*/ double gfilter(double x) { define G16 (7.613857126244286e-05)
    #define G15 (1.803089206070547e-04)
    #define G14 (4.039001919005719e-04)
    #define G13 (8.580586985857306e-04)
    #define G12 (1.715223893126822e-03)
    #define G11 (3.251701939967811e-03)
    #define G10 (5.831026268138501e-03)
    #define G09 (9.890622382335143e-03)
    #define G08 (1.586889182891397e-02)
    #define G07 (2.408318566948984e-02)
    #define G06 (3.457208908781445e-02)
    #define G05 (4.694417038746243e-02)
    #define G04 (6.029510682574100e-02)
    #define G03 (7.325323772539470e-02)
    #define G02 (8.418135970604142e-02)
    #define G01 (9.150596451859631e-02)
    #define G00 (9.408648097365654e-02)

define GFILTER_STATESIZE 1024 static double state[GFILTER_STATESIZE] = {
        0.0, 0.0, 0.0, 0.0, 0.0, 0.0, 0.0, 0.0,
        0.0, 0.0, 0.0, 0.0, 0.0, 0.0, 0.0, 0.0,
```

```
    0.0, 0.0, 0.0, 0.0, 0.0, 0.0, 0.0, 0.0,
    0.0, 0.0, 0.0, 0.0, 0.0, 0.0, 0.0, 0.0,
    0.0, 0.0, 0.0, 0.0, 0.0, 0.0, 0.0, 0.0,
    0.0, 0.0, 0.0, 0.0, 0.0, 0.0, 0.0, 0.0,
    0.0, 0.0, 0.0, 0.0, 0.0, 0.0, 0.0, 0.0,
    0.0, 0.0, 0.0, 0.0, 0.0, 0.0, 0.0, 0.0
  };

static int loc=32;

state[loc]=x;

double *right=&state[loc];

#if 0
  double accum;
  double *left=&state[loc-32];

accum=G16*(*right--+*left++);
  accum+=G15*(*right--+*left++);
  accum+=G14*(*right--+*left++);
  accum+=G13*(*right--+*left++);
  accum+=G12*(*right--+*left++);
  accum+=G11*(*right--+*left++);
  accum+=G10*(*right--+*left++);
  accum+=G09*(*right--+*left++);
  accum+=G08*(*right--+*left++);
  accum+=G07*(*right--+*left++);
  accum+=G06*(*right--+*left++);
  accum+=G05*(*right--+*left++);
  accum+=G04*(*right--+*left++);
  accum+=G03*(*right--+*left++);
  accum+=G02*(*right--+*left++);
```

```
  accum+=G01*(*right--+*left++);
  accum+=G00**right;
#endif
#if 1
  double accum= G16*(right[0]+right[-32])+
           G15*(right[-1]+right[-31])+
           G14*(right[-2]+right[-30])+
           G13*(right[-3]+right[-29])+
           G12*(right[-4]+right[-28])+
           G11*(right[-5]+right[-27])+
           G10*(right[-6]+right[-26])+
           G09*(right[-7]+right[-25])+
           G08*(right[-8]+right[-24])+
           G07*(right[-9)+right[-23])+
           G06*(right[-10]+right[-22])+
           G05*(right[-11]+right[-21])+
           G04*(right[-12]+right[-20])+
           G03*(right[-13]+right[-19])+
           G02*(right[-14]+right[-18])+
           G01*(right[-15]+right[-17])+
           G00*(right[-16]);
#endif
  if (++loc==GFILTER_STATESIZE) { memcpy(&state[0], &state[GFILTER_STATESIZE-32],
32*sizeof(*state))i;
    loc=32;

} return accum;

}
```

```
/* process_sample run all registered receiver algorithms on the latest sample

*/ void process_sample(double s, double o) { for (list<rxinfo>::iterator i=rxlist.begin(); i!=rxlist.end(); i++) {
     i->receiver->new_sample(s, o);
  }

}

/* generate_sample produce noisy gfsk samples from nrz samples

*/ double generate_sample(double nrz) {

/* compute the phase */ double phase=mphase+cphase+chirpphase;

double ri=ampscale*cos(phase)+noisescale*noise();
  double rq=ampscale*sin(phase)+noisescale*noise();
```

```
/* update the phases */ double m=gfilter(nrz);
mphase+=mphase_scale*m;

cphase+=dcphase; if (cphase>2*PI) cphase-=2*PI;

double chirpf=clip(adrift*triangle(chirpfphase), fmaxdrift);

chirpphase+=chirpphase_scale*chirpf;
if (chirpphase>2*PI) chirpphase-=2*PI;

chirpfphase+=dchirpfphase;
if (chirpfphase>2*PI) chirpfphase-=2*PI;

/* discriminator */ int ip = ( ri>=0.0 ? +1 : -1 ) ;
int qp = ( rq>=0.0 ? +1 : -1 ) ;

int det = qp*ip_z-qp_z*ip ;

ip_z=ip;
qp_z=qp;

/* reconstruction */ define GGG 7.277254929000110e-05 define A11 -1.662009959637715e+00
define A12  6.945706597008273e-01 define A21 -1.825297781912184e+00
```

```
define A22   8.610574795349009e-01 double stage1=(double) (det+2*det_z+det_zz)-A11*stage1_z-
A12*stage1_zz;
   double stage2=stage1+2*stage1_z+stage1_zz-A21*stage2_z-
A22*stage2_zz;

stage2_zz=stage2_z; stage2_z=stage2;
   stage1_zz=stage1_z; stage1_z=stage1;
   det_zz=det_z; det_z=det;

double out=GGG*stage2;

// delay m by 17, mult by 8*fdev/fs and add 8*fif/fs to match out
// delay mrz by 17+16, mult by ditto and add ditto to match out
//cout << nrz << ' ' << m << ' ' << out << ' ' << chirpf << endl
;
//cout << nrz << ' ' << m << ' ' << mphase << ' ' << chirpphase
<<
' ' <<
// out << endl ;

process_sample (out, 8.0*(fif+foff+chirpf)/fs);

return out;

}

/* generate_symbol produce the samples for the symbol
```

```c
*/ void generate_symbol(signed char s) { int i;

for (i=0; i<spb; i++) { generate_sample((double)s); }

}

/* generate_bit produce a random bit and generate its symbol

*/ void generate_bit (void) { unsigned char b = random_bit() ? +1 : -1 ;

truebits.new_bit(b);

generate_symbol(b);

}

/* generate_preamble

*/
```

```
void generate-preamble() { int i;

for (i=0; i<carrierbits; i++) { generate_symbol(0); }
  for (i=0; i<syncbits; i++) { generate_symbol ( i&1 ? 1 : -1 );
}

} int main(void) { int i;

initialize();

generate-preamble();

for (i=0; i<skipbits; i++)  generate_bit();
  for (i=0; i<nbits; i++)     generate_bit();
  for (i=0; i<flushbits; i++) generate_bit();

for (list<rxinfo>::iterator i=rxlist.begin(); i!=rxlist.end();
i++) {
     i->receiver->printber(truebits, i->name, skipbits);

} resources();

}
```

APPENDIX C

```verilog
//*******************************************************************
// RCS HEADER -- DO NOT ERASE
// $Author: johnl $
// $Id: mem.v,v 1.29 2000/06/08 00:10:56 johnl Exp $
// Pivotal Technologies
//*******************************************************************

`define RAM_SIZE 512
`define RAM_ADDR 9
`define SCO_SIZE 32
`define SCO_ADDR 5 module byte_reader(reset,clk,dout,fetch,byte,update,align);
input reset,clk;
input fetch;   // fetch a bit   (to reader out)
input align;
input [7:0] byte;
output dout;
output update;   // grab a byte   (to write in)

reg [2:0] ptr;

assign dout = byte[ptr];

always @(posedge reset or posedge clk)
  begin
  if (reset)
    ptr <= 3'd0;
  else if (align)
```

```verilog
      ptr <= 3 'd0;
    else if (fetch)
      ptr <= ptr + 1;
  end wire update = (ptr == 7) ? fetch : 1 'b0;

endmodule module byte_loader(reset,clk,din,valid,byte,load,flush);
input reset,clk,din,valid;
input flush; // OR of accept and reject
output [7:0] byte; wire [7:0] byte;
output       load;
reg [6:0] hold;
reg [2:0] ptr;

assign byte = { din, hold};

always @(posedge reset or posedge clk)
  begin
  if (reset)

begin
    hold <= 7 'd0;
    ptr  <= 3 'd0;
    end
  else if (flush)
    ptr <= 3 'd0;
  else if (valid)
    begin
    hold[ptr] <= din;
```

```verilog
      ptr <= ptr + 1;
    end
  end wire load = (flush && ptr > 0) ? 1'b1 :
            (ptr == 7) ? valid : 1'b0;
endmodule // for rx acl
module pipo_ctrl(reset,clk,reject,accept,clear,next,
                 wr,rd,waddr,raddr,empty,full,more_data);
input reset,clk,reject,accept,clear,next,wr,rd;
output [`RAM_ADDR : 0] waddr, raddr;
output empty,full;
reg    empty,full;
reg    [`RAM_ADDR : 0] waddr, raddr;
output more_data;
reg [`RAM_ADDR :0] numitems0, numitems1;

assign  more_data = raddr[`RAM_ADDR] ? (numitems1 > 0) : (numitems0
> 0);

always @(posedge reset or posedge clk)
  begin
  if (reset)
    begin
    waddr = {1'b0,`RAM_ADDR ' d0};
    raddr = {1'b0,`RAM_ADDR ' d0};
    empty = 1'b1;
    full  = 1'b0;
    numitems0 = {1'b0, `RAM_ADDR'd0};
    numitems1 = {1'b0, `RAM_ADDR'd0};
```

```
      end
else
  begin
  if (wr)
    waddr[`RAM_ADDR -1:0] = waddr[`RAM_ADDR -1:0] +1;
  if (rd)
    begin
    if (raddr[`RAM_ADDR])
      numitems1 = numitems1 -1;
    else
      numitems0 = numitems0 -1;

raddr[`RAM_ADDR -1:0] = raddr[`RAM_ADDR -1:0] +1;
    end if (accept && !full)

begin
    if (waddr[`RAM_ADDR])
      numitems1 = waddr[`RAM_ADDR -1:0];
    else
      numitems0 = waddr[`RAM_ADDR -1:0];

waddr[`RAM_ADDR]      = ~waddr [`RAM_ADDR];
    waddr[`RAM_ADDR -1:0] = `RAM_ADDR'd0;
    if (!empty) full  = 1'b1;
    else        empty = 1'b0;
    end
  else if (reject)
    begin
    waddr[`RAM_ADDR -1:0] = `RAM_ADDR'd0;
    end
```

```verilog
    if (next && !empty)
      begin
      raddr[`RAM_ADDR]       = ~raddr[`RAM_ADDR];
      raddr[`RAM_ADDR -1:0]  = `RAM_ADDR'd0;
      if (full)   full  = 1'b0;
      else        empty = 1'b1;
      end
    else if (clear)
      begin
      waddr = {1'b0,`RAM_ADDR'd0};
      raddr = {1'b0,`RAM_ADDR'd0};
      empty = 1'b1;
      full  = 1'b0;
      numitems0 = {1'b0, `RAM_ADDR'd0};
      numitems1 = {1'b0, `RAM_ADDR'd0};
      end
    end
  end
endmodule //////////////////////////
// RAM model            //
////////////////////////// module ram_model_dpx8x32 (clk, wr, wdata, rdata, waddr, raddr);
input clk, wr;
input  [`SCO_ADDR -1:0] waddr, raddr;
input  [7:0] wdata;
output [7:0] rdata; wire   [7:0] rdata;
reg    [`SCO_ADDR -1:0] raddr_stage;

// memory array
reg    [7:0] ram[0:`SCO_SIZE -1] /* synthesis
```

```
syn_ramstyle="block_ram" */ ;

assign rdata = ram[raddr];    // read always @(posedge clk) begin
  if (wr) ram[waddr] <= wdata;
  end
endmodule module ram_model_spx8 (clk, wr, wdata, rdata, addr);
input clk, wr;
input  [`RAM_ADDR -1:0] addr;
input  [7:0] wdata;
output [7:0] rdata; wire   [7:0] rdata;
reg    [7:0] ram[0:`RAM_SIZE -1] /* synthesis
syn_ramstyle="block_ram" */ ;
assign rdata = ram[addr];    // read always @(posedge clk) begin
  if (wr) ram[addr] <= wdata;
  end endmodule module ram_model2_dpx8 (clk, wr, wdata, rdata, waddr, raddr);
input clk, wr;
input  [`RAM_ADDR :0] waddr, raddr;
input  [7:0] wdata;
output [7:0] rdata; wire   [7:0] rdata;

// memory array
reg    [7:0] ram[0:`RAM_SIZE*2 -1] /* synthesis
```

```
syn_ramstyle="block_ram" */ ;

assign rdata = ram[raddr];    // read always @(posedge clk) begin
   if (wr) ram[waddr} <= wdata;
   end endmodule module ram_model_dpx8 (clk, wr, wdata, rdata, waddr, raddr);
input clk, wr;
input   [`RAM_ADDR -1:0] waddr, raddr;
input   [7:0] wdata;
output [7:0] rdata; wire   [7:0] rdata;

// memory array
reg    [7:0] ram[0:`RAM_SIZE -1] /* synthesis
syn_ramstyle="block_ram" */ ;

assign rdata = ram[raddr];    // read always @(posedge clk) begin
   if (wr) ram[waddr] <= wdata;
   end endmodule `define ELS 2
`define ELS_SIZE 4
module ram_model_dpx1 (clk, wr, din, dout, waddr, raddr);
input clk, wr;
```

```verilog
input din;
input [`ELS -1:0] waddr, raddr;
output dout;

reg [0:`ELS_SIZE -1] ram;
assign dout = ram[raddr];

always @(posedge clk) begin
  if (wr) ram[waddr] <= din;
  end endmodule

/////////////////////////
// FIFO controller    //
/////////////////////////
// for tx acl
module tito_ctrl (clk, reset, wr, rd, got_tx, wait_for_ack,
                  addr, ack, sent, next, clear, restart);
input clk, reset;
input wr, rd;
input sent, ack;
input next, clear;    // from host
input restart;
output got_tx; reg got_tx;
output wait_for_ack; reg wait_for_ack;

output [`RAM_ADDR -1 : 0] addr;
reg    [`RAM_ADDR -1 : 0] addr;

reg [1:0] state;
always @(posedge reset or posedge clk)
  begin
```

```
if (reset)
  begin
  addr = {`RAM_ADDR'd0};
  got_tx   = 1'b0;   // write from host
  wait_for_ack = 1'b0;
  end
else if (clear)
  begin
  addr = {`RAM_ADDR'd0};
  got_tx   = 1'b0;   // write from host
  wait_for_ack = 1'b0;
  end
else if (sent && got_tx)  // at the end of tx
  begin
  addr = {`RAM_ADDR'd0};
  got_tx = 1'b1;
  wait_for_ack = 1'b1;
  end
else if (ack & wait_for_ack)   // at rx header
  begin
  addr = {`RAM_ADDR'd0};
  got_tx = 1'b0;
  wait_for_ack = 1'b0;
  end
else if (next)    // host done writing, ready to send
  begin
  addr = {`RAM_ADDR'd0};
  got_tx = 1'b1;
  wait_for_ack = 1'b0;
  end
else if (restart) // uc has to start again, eg timeout
  begin
  addr = {`RAM_ADDR'd0};
```

```
      wait_for_ack = 1'b0;
      end
   else if (wr | rd) // host writing or baseband reading to be transmitted
      addr = addr + 1;
   end endmodule // for sco buffers, tx and rx
module fifo_ctrl (clk, reset, wr, rd, waddr, raddr, full, empty,numitems);

input clk, wr, rd, reset;
output [`SCO_ADDR -1: 0] waddr, raddr;
output full, empty;
output [`SCO_ADDR -1 :0] numitems;

reg [`SCO_ADDR -1 :0] waddr;
reg [`SCO_ADDR -1 :0] raddr;
reg [`SCO_ADDR    :0] numitems;
wire full, empty;

always @(posedge clk or posedge reset)
   begin
   if (reset)
      begin
      waddr = `SCO_ADDR'd0;
      raddr = `SCO_ADDR'd0;
      numitems = {1'b0,`SCO_ADDR'd0 };
      end
   else
```

```
    begin if (wr && !full)
        begin
        waddr    = waddr + 1;
        numitems = numitems + 1;
        end if (rd && !empty)
        begin
        raddr    = raddr + 1;
        numitems = numitems -1;
        end end end assign full   =  numitems[`SCO_ADDR];
assign empty  =  (numitems == 0);

endmodule module acl_fifo(clk, reset, write, read, din, data, empty, full,
                accept, reject, next, clear, more_data);
  input clk, reset;
  input write, read;
  input din;        // from data path
  input accept, reject;  // from uc
  input next, clear;     // from host
  output [7:0] data; wire [7:0] data;
  output empty, full; wire empty, full;
  output more_data;
```

```
wire load;
wire [`RAM_ADDR :0] waddr, raddr;
wire [7:0] byte;

ram_model2_dpx8 iram (.clk(clk),
                .wr (load),        // from RF
                .wdata(byte),      // from RF
                .rdata(data),      // to uart
                .waddr(waddr),
                .raddr (raddr)
                );

pipo_ctrl ictrl   (.reset(reset),
                .clk(clk),
                .reject(reject),
                .accept(accept),
                .clear(clear),
                .next(next),
                .wr(load),
                .rd(read),
                .waddr(waddr),
                .raddr(raddr),
             .more_data(more_data),
                .empty(empty),
                .full(full)
                );

wire flush = accept | reject;
byte_loader ibyte (.reset(reset),
                .clk(clk),
                .din(din),
                .valid(write),
                .byte(byte),
```

```
                    .load(load),
                    .flush(flush)
                    );

endmodule module sco_fifo(clk, reset, din, data, write, read, empty,
full,align);
input clk, reset;
input din;
input write,read;
input align;   // end of packet
output empty, full;  wire empty, full;
output [7:0] data; wire [7:0] data;
wire [7:0] byte;
wire [`SCO_ADDR -1 :0] waddr;
wire [`SCO_ADDR -1 :0] raddr;
wire [`SCO_ADDR    :0] numitems;
wire load;

ram_model_dpx8x32 iram    (.clk(clk),              // SCO
                    .wr(load),       // from RF
                    .wdata(byte),            // from RF
                    .rdata(data),     // to uart
                    .waddr(waddr),
                    .raddr(raddr)
                    );

fifo_ctrl ictrl    (.clk(clk),
                    .reset(reset),
                    .wr(load),
                    .rd(read),
```

```
                    .waddr(waddr),
                    .raddr(raddr),
                  .numitems(numitems),
                    .full(full),
                    .empty(empty)
                    );

byte_loader ibyte (.reset(reset),
                   .clk(clk),
                   .din(din),
                   .byte(byte),
                   .valid(write),
                   .load(load),
                   .flush(align));

endmodule

// tx data (acl) fifo
module data_fifo(clk, reset, write, read, dout, data, got_tx,
                 wait_for_ack, ack, sent, next, clear, restart);
input clk, reset;
input write, read;
input sent, ack;// tx_uc
input next, clear; // host
input [7:0] data;
input restart;
output dout;
output got_tx,wait_for_ack;
wire sent, ack;
wire next, clear;
wire dout;
wire update;
wire flush = ack | sent | next | clear | restart;
```

```verilog
wire [7:0] byte;
wire [`RAM_ADDR -1:0] addr;
wire got_tx;

tito_ctrl itito (
    .clk(clk),
    .reset(reset),
    .wr(write),
    .rd(update),
    .got_tx(got_tx),
    .wait_for_ack(wait_for_ack),
    .addr(addr),
    .ack(ack),
    .sent(sent),
    .next(next),
    .restart(restart),
    .clear(clear)
    );

byte_reader ibyte (
    .reset(reset),
    .clk(clk),
    .dout(dout),
    .fetch(read),
    .byte(byte),
    .update(update),
    .align(flush)
    );

ram_model_spx8 iram (
    .clk(clk),
    .wr(write),
    .wdata(data),
```

```verilog
    .rdata(byte),
    .addr(addr)
    );

endmodule

// tx voice (sco) fifo
module voice_fifo(clk, reset, dout, data, write, read, empty,
full,align,numitems);
input clk, reset;
input write, read;
input [7:0] data;
output empty,full;
input align;    // end of packet must be flush
output dout; wire dout;
output [`SCO_ADDR :0] numitems;
wire [7:0] byte;
wire [`SCO_ADDR -1 :0] waddr;
wire [`SCO_ADDR -1 :0] raddr;
wire [`SCO_ADDR  :0] numitems;

byte_reader ibyte (
    .reset(reset),
    .clk(clk),
    .dout(dout),
    .fetch(read),
    .byte(byte),
    .update(update),
    .align(align)
    );

fifo_ctrl ictrl (
    .clk(clk),
```

```
    .reset(reset),
    .wr(write),
    .rd(update),
    .waddr(waddr),
    .raddr(raddr),
    .full(full),
    .numitems(numitems),
    .empty(empty)
    );

ram_model_dpx8x32 iram (
    .clk(clk),
    .wr(write),
    .wdata(data),
    .rdata(byte),
    .waddr(waddr),
    .raddr(raddr)
    );

endmodule
```

// INTRODUCTIN:
// data buffer can be configured to function as 7 fifos, and more...
// the hardware views the data buffer as 7 fifo, each fifo starting
// at its corresponding location of the 7 sl_addr registers.
// the software view the data buffer as one big contiguous memory,
// it can burst in data starting at any location.
// OPERATION:
// 0. at initialization, software load the 7 fifo starting address

```
//      and define the 7 fifos for the hardware.
// 1.   during transmittion, software init the host_addr counter,
//      then burst in data starting at the host_addr counter.
//        (usually at the corresponding sl_addr of the intended slave,
//      but doesn't have to be)
// 2.   once software completed loading data (usually a packet),
//      software can flip one of the 7 ok2send bits to indicate
//      to hardware that a packet is ready to be sent to the slave
//      as indicated by the corresponding got_tx bits.
// 3.   when the tx slot to that slave arrives, hardware initializes
//      read counter with the sl_addr of the slave, and read off the
//      message from the buffer.
// 4.   when hard successfully transmitted the message, it flip the
//      got_tx bit to indicate to software that the slave's fifo is ready
//      for another message
// TRICK USE:
// 5.   the software can use the same bursting mechanism to burst into
//      the same memory location again (repeating step 1.2).
//      OR, it might have loaded another packet in another area of the
//      memory.
// 6.   the software can then change the corresponding sl_addr to
//        this new location, and flip the ok2send (and got tx) again!!
//      and essentially achieve ping-pong fifo.
// 7.   this is also an easy way to broadcast a message to only selected
```

```
//      slaves, the software does not have to reload the packet.

module data_buffer(clk, reset, host_wr, path_rd, dout, data, got_tx,
                wait_for_ack, ack, sent, ok2send, flush, restart, start_tx,
                sl_addr1, sl_addr2, sl_addr3, sl_addr4, sl_addr5,
                sl_addr6, sl_addr7, host_data_bus, host_addr_out,
                    host_addr_init0, host_addr_init1,
                    path_sl_sel, host_sl_sel
                    );

input clk, reset;
input host_wr, path_rd;    // host write, path bitwise read
input start_tx;
input sent, ack;// tx_uc
input ok2send,flush;    // host next, host clear
input [7:0] data;
input [2:0] path_sl_sel, host_sl_sel;
input [`RAM_ADDR -1:0] sl_addr1, sl_addr2, sl_addr3, sl_addr4,
                 sl_addr5, sl_addr6, sl_addr7;
input [7:0] host_data_bus;
output [`RAM_ADDR -1:0] host_addr_out;
input host_addr_init0, host_addr_init1;

input restart;    // restart the queue selected by path_sl_sel
output dout;
output got_tx,wait_for_ack;

reg [`RAM_ADDR -1:0] host_addr, path_addr;
reg [7:0] got_tx_array;
reg [7:0] wait_ack_array;
wire path_byte_rd;
```

```verilog
assign host_addr_out = host_addr;

always @(posedge clk or posedge reset)
  if (reset)
    host_addr <= `RAM_ADDR'd0;
  else if (host_addr_init0)
    host_addr[7:0] <= host_data_bus;
  else if (host_addr_init1)
    host addr[`RAM_ADDR -1:8] <= host_data_bus;
  else if (host_wr)
    host_addr <= host_addr + 1;
  else;

always @(posedge clk or posedge reset)
  if (reset)
    path_addr <= `RAM_ADDR'd0;
  else if (start_tx)
    case (path_sl_sel)
    3'd1: path_addr <= sl_addr1;
    3'd2: path_addr <= sl_addr2;
    3'd3: path_addr <= sl_addr3;
    3'd4: path_addr <= sl_addr4;
    3'd5: path_addr <= sl_addr5;
    3'd6: path_addr <= sl_addr6;
    3'd7: path_addr <= sl_addr7;
    default:
        path_addr <= `RAM_ADDR'd0;
    endcase
  else if (path_byte_rd)
    path_addr <= path_addr + 1;
  else;

wire [7:0] byte;
```

```
byte_reader ibyte (
    .reset(reset),
    .clk(clk),
    .dout(dout),
    .fetch(path_rd),
    .byte(byte),
    .update(path_byte_rd),
    .align(start_tx)
    );

ram_model_dpx8 iram (
    .clk(clk),
    .wr(host_wr),      // from RF
    .wdata(data),      // from host
    .rdata(byte),      // to path
    .waddr(host_addr),
    .raddr(path_addr)
    );

always @(posedge reset or posedge clk)
  begin
  if (reset)
    begin
    got tx array = 8'd0;
    wait_ack_array = 8'd0;
    end
  else
    begin
    got_tx_array [host_sl_sel]   = (got_tx_array[host_sl_sel] |
ok2send) & ~flush;
    wait_ack_array [host_sl_sel] = wait_ack_array[host_sl_sel &
~(flush | ok2send);
```

```verilog
      if (sent)
        wait_ack_array[path_sl_sel] = got_tx_array[path_sl_sel];
      else if (ack)
        begin
          wait_ack_array[path_sl_sel] = 1'b0;
          got_tx_array[path_sl_sel] = wait_ack_array[path_sl_sel] ?
1'b0 :
                                      got_tx_array[path_sl_sel];
        end
      else if (restart)
        wait_ack_array[path_sl_sel] = 1'b0;
      else;

end
  end wire got_tx = got_tx_array[path_sl_sel];
wire wait_for_ack = wait_ack_array[path_sl_sel];

endmodule

// e-buffer is size 8
module
elastic_buff(clk,reset,din,jam,dout,empty,full,fetch,hop_start);
input clk, reset;
input din,jam;   // input from demod, this is asynchronous
input fetch;   // baseband grabbing data
input hop_start; // clear the buffer
output dout;    // data out to baseband
output empty,full;  // indicate to baseband //reg write0, write1;
```

```
//always @(posedge clk or posedge reset)
//   begin
//   if (reset)
//     begin
//     write0 <= 1'b0;
//     write1 <= 1'b0;
//     end
//   else
//     begin
//     write0 <= jam;
//     write1 <= write0;
//     end
//   end
//
//wire write = (write0 == 1'b1 && write1 == 1'b0) ? 1'b1 : 1'b0;
wire write = jam;
wire read = fetch;

reg [`ELS:0] numitems;
reg [`ELS -1:0] waddr, raddr;
always @(posedge clk or posedge reset)
  begin
  if (reset || hop_start)
    begin
    waddr = `ELS'd0;
    raddr = `ELS'd0;
    numitems = {1'b0,`ELS'd0};
    end
  else
    begin
    if (write && !full)
      begin
      waddr = waddr + 1;
```

```
      numitems = numitems + 1;
      end
    if (read && !empty)
      begin
      raddr = raddr + 1;
      numitems = numitems -1;
      end
    end
  end wire empty = (numitems == 0) ? 1'b1 : 1'b0;
wire full  = numitems[`ELS];

ram_model_dpx1 iram (.clk(clk),
              .wr(write),
           .din(din),
           .dout(dout),
           .waddr(waddr),
           .raddr(raddr)
           );

endmodule
```

APPENDIX D

INCLUDE "bt format"

FILLER "X"
assemble length

```
    org 0
    rx_start:
 0  branch end_of_packet,id_only parse_header:
 1  active enable_white
 2  active enable-hec
 3  active decode_fec1
 4  force 0,accu
 5  parse demod,bucket,9  /* align upto am_addr */
 6  verify 0x07,am_addr
 7  branch am_addr_match,true
    am_addr_mismatch:
 8  or_into 0x01,accu
    am_addr_match:
 9  parse demod,bucket,1         /* shift in last bit of the
header */
10  inject bucket,2   /* align up to type */
11  store type
12  inject bucket,4   /* align up to flow shift out type */
13  store flow
14  inject bucket,1   /* align up to arqn, shift out flow */
15  store arqn
16  inject bucket,1   /* align up to seqn, shift out arqn */
17  verify 0x01,seqn           /* seqn_new == seqn_old ? */
18  branch seqn_is_new,false
```

```
19  or_into 0x02,accu          /* seqn is old */
    seqn_is_new:
20  parse demod,bucket,8        /* cycle thru hec */
21  release decode_fec1
22  release enable_hec          /* at this moment, 1 seqn + 8 hec is in shift */ process header:
23  branch reject_payload,crc_failed   /* if hec error */
24  compare 0x01,accu,0x01      /* if am_addr mismatch */
25  branch end_of_packet,true
26  compare 12,type,0x0f        /* undefined type */
27  branch end_of_packet,true
28  compare 13,type,0x0f        /* undefined type */
29  branch end_of_packet,true
30  compare 0x00,arqn,0x01      /* if there was no ack */
31  branch dontcare_seqn,true   /* if not acknowledge
                                   */
    acknowledged:
32  call sb_ack_previous_acl,wait_for_ack   /* if tx_fifo is
waiting to be acked */
    dontcare_seqn:
33  compare 1,type,0x0f         /* poll */
34  branch process_poll,true
35  compare 0,type,0x0f         /* null */
36  branch end_of_packet,true
37  compare 5,type,0x0f         /* hv1 */
38  branch process_hv1,true
39  compare 6,type,0x0f         /* hv2 */
40  branch process_hv2,true
41  compare 7,type,0x0f         /* hv3 */
```

```
42   branch process_hv3,true
43   compare 8,type,0x0f       /* dv  */
44   branch process_dv,true
  but_care_fifo_full:
45   branch reject_payload, full  /* it's full */
46   compare 2,type,0x0f       /* fhs  */
47   branch process_fhs,true
48   compare 9,type,0x0f       /* aux1 */
49   branch process_aux1,true
  care_about_seqn:
50   compare 0x02,accu,0x02       /* if seqn is old */
51   branch redundant-payload,true
52   compare 3,type,0x0f       /* dm1  */
53   branch process_dm1,true
54   compare 10,type,0x0f      /* dm3  */
55   branch process_dm3,true
56   compare 14,type,0x0f      /* dm5  */
57   branch process_dm5,true
58   compare 4,type,0x0f       /* dh1  */
59   branch process_dh1,true
60   compare 11,type,0x0f      /* dh3  */
61   branch process_dh3,true
62   compare 15,type,0x0f      /* dh5  */
63   branch process_dh5,true
64   branch end_of_packet,always sb_ack_previous_acl:
65   active ack          /* tx fifo acknowledge, allows new tx data packet */
66   increase 1,seqnx    /* toggle seqn back to the other */
67   rtn,
```

```
sb_inject_type:
68  preload type
69  inject acl,8
70  rtn, sb_inject_temp:
71  preload temp
72  inject acl,8
73  rtn, process_poll:
74  force 1,seqnx
75  force 0,seqn
76  branch end_of_packet,always process_dm1:
77  force 3,temp
78  call sb_inject_temp,always
79  active enable_crc
80  active decode_fec2
81  parse demod,acl,3   /* parse in 1ch + flow */
82  parse demod,acl,5   /* parse in 5 bit packetlength */
83  inject bucket,4 /* align packet length */
84  store stuff_counter
85  stuff demod,acl
86  parse demod,bucket,16  /* cycle through the crc */
87  release enable_crc
88  release decode_fec2
89  branch reject_payload,crc_failed
90  branch accept-payload,always process_dm3:
process_dm5:
```

```
91   call sb_inject_type,always
92   active enable_crc
93   active decode_fec2
94   parse demod,acl,3    /* parse in lch+flow */
95   parse demod,acl,9    /* packet length */
96   store stuff_counter
97   parse demod,acl,4    /* undefined */
98   stuff demod,acl
99   parse demod,bucket,16    /* cycle through the crc */
100  release enable_crc
101  release decode_fec2
102  branch reject-payload,crc_failed
103  branch accept-payload,always process_dh1:
104  active enable_crc
105  active decode_fec0
106  call sb_inject_type,always
107  parse demod,acl,3    /* L_CH + flow */
108  parse demod,acl,5    /* packet counter */
109  inject bucket,4  /* align it to 9 */
110  store stuff_counter
111  stuff demod,acl
112  parse demod,bucket,16   /* cycle through the crc */
113  release enable_crc
114  release decode_fec0
115  branch reject_payload,crc_failed
116  branch accept_payload,always process_dh3:
   process_dh5:
117  call sb_inject_type,always
118  active enable_crc
```

```
119  active decode fec0
120  parse demod,acl,3    /* l_ch+flow */
121  parse demod,acl,9    /* payload length */
122  store stuff_counter
123  parse demod,acl,4    /* undefined */
124  stuff demod,acl
125  parse demod,bucket,16    /* cycle through the crc */
126  release enable_crc
127  release decode_fec0
128  branch reject_payload.crc_failed
129  branch accept_payload,always process_aux1:
130  active decode_fec0
131  call sb_inject_type,always
132  parse demod,acl,3    /* L_CH + flow */
133  parse demod,acl,5    /* payload length */
134  inject bucket,4    /* make it 9 */
135  store stuff_counter
136  stuff demod,acl
137  release decode fec0
138  active accept
139  branch end_of_packet,always process_fhs:
140  active enable_crc
141  active decode_fec2
142  call sb_inject_type,always
143  parse demod,acl,72
144  store fhs0
145  parse demod,acl,72
146  store fhs1
147  parse demod,bucket,16    /* cycle through the crc */
```

```
148   preload clk_offset
149   inject acl,32        /* send clock offset to host */
150   release enable_crc
151   release decode_fec2
152   branch reject_payload,crc_failed
153   branch accept_payload,always process_hv1:
154   active decode_fec1
155   force 10,stuff_counter
156   branch process_hv1_into_acl,sco2acl
157   stuff demod,sco
158   branch process_hv1_end,always
    process_hv1_into_acl:
159   branch process_hv1_end,full
160   call sb_inject_type,always
161   stuff demod,acl
162   active accept
    process_hv1_end:
163   release decode_fec1
164   branch end_of_packet,always process_hv2:
165   active decode_fec2
166   force 20,stuff_counter
167   branch process_hv2_into_acl,sco2acl
168   stuff demod,sco
169   branch process_hv2_end,always
    process_hv2_into_acl:
170   branch process_hv2_end,full
171   call sb_inject_type,always
172   stuff demod,acl
173   active accept
``` process_hv2_end:
174  release decode_fec2
175  branch end_of_packet,always process_hv3:
176  active decode_fec0
177  force 30,stuff_counter
178  branch process_hv3_into_acl,sco2acl
179  stuff demod,sco
180  branch process_hv3_end,always
process_hv3_into_acl:
181  branch process_hv3_end,full
182  call sb_inject_type,always
183  stuff demod,acl
184  active accept
process_hv3_end:
185  release decode-fec0
186  branch end_of_packet,always process_dv:
dv voice:
187  active decode_fec0
188  force 10,stuff_counter
189  branch process_dv_into_acl,sco2acl
190  stuff demod,sco
191  branch process_dv_voice_end,always
process_dv_into_acl:
192  branch process_dv_voice_end,full
193  force 5,temp
194  call sb_inject_temp,always
195  stuff demod,acl
196  active accept
process_dv_voice_end:

```
197  release decode_fec0
  dv_data:
198  branch reject_payload,full   /* it's full */
199  compare 0x02,accu,0x02   /* if seqn is old */
200  branch reject_payload,true
201  branch process_dm1,always reject_payload:
202  force 0, arqnx
203  active reject
204  branch end_of_packet,always accept_payload:
205  force 1, arqnx
206  increase 1,seqn
207  active accept
208  branch end_of_packet,always
```

```
    redundant_payload:
209  force 1,arqnx
    not_my_payload:
210  active reject end_of_packet:

211  release enable_white 212  sleep org 224
    bypass_start:
224  branch bypass_end,full
225  force 256,stuff_counter
226  active decode fec0
227  stuff demod,acl
228  active accept
229  release decode fec0
    bypass_end:
230  sleep org 256
    tx_start:
      branch end_of_packet,id_only must_send_header:
257  active enable_white
258  active enable_hec
259  active encode_fec1
260  preload am_addr
261  inject mod,3
```

```
262  compare 1,typex,0x0f        /* poll */
263  branch transmit-poll,true
264  compare 0,typex,0x0f        /* null */
265  branch transmit_null,true
266  compare 5,typex,0x0f        /* hv1 */
267  branch transmit_hv1,true
268  compare 6,typex,0x0f        /* hv2 */
269  branch transmit_hv2,true
270  compare 7,typex, 0x0f       /* hV3 */
271  branch transmit_hv3,true
272  compare 8,typex,0x0f        /* dv */
273  branch transmit_dv,true
274  branch slave_skip,is_master  /* fhs in slave doesn't need ack */
275  compare 2,typex,0x0f        /* fhs in slave */
276  branch transmit_valid,true   /* no need to wait for got_tx */ slave_skip:
277  compare 12,typex,0x0f       /* undefined */
278  branch transmit_null,true
279  compare 13,typex,0x0f       /* undefined */
280  branch transmit_null,true
281  branch transmit_valid,got_tx transmit_null:
282  force 0,temp
283  preload temp
284  call sb_transmit_header_after_type,always
285  branch end_of_packet,always transmit_poll:
286  force 1,seqnx
```

```
287    force 0,seqn
288    force 1,temp
289    preload temp
290    call sb_transmit_header_after_type,always
291    branch end_of_packet,always transmit valid:
292    compare 0,flow,0x01           /* go = 1, stop = 0 */
293    branch transmit_null,true
294    preload typex
295    call sb_transmit_header_after_type,always transmit-payload:
296    compare 2,typex,0x0f     /* fhs */
297    branch transmit_fhs,true /* master mode fhs need got tx and ack */ transmit_data_payloads:
298    compare 3,typex,0x0f     /* dm1 */
299    branch transmit_dm1,true
300    compare 10,typex,0x0f    /* dm3 */
301    branch transmit_dm3,true
302    compare 14,typex,0x0f    /* dm5 */
303    branch transmit_dm5,true
304    compare 4,typex,0x0f     /* dh1 */
305    branch transmit_dh1,true
306    compare 11,typex,0x0f    /* dh3 */
307    branch transmit_dh3,true
308    compare 15,typex,0x0f    /* dh5 */
309    branch transmit_dh5,true
310    branch transmit_aux1,always  /* must be type=9, aux1 */
```

```
    transmit_fhs:
311   active enable_crc
312   active encode_fec2
313   preload fhs0
314   inject mod,72
315   preload fhs1
316   inject mod,72
317   active enable_parity      /* enable_crc/hec must remain
                                   acitve */
318   inject mod,16
319   release enable_parity
320   release encode_fec2
321   release enable_crc
322   branch end_of_packet,always transmit_dm1:
323   active enable_crc
324   active encode_fec2
325   parse data,mod,3          /* send lch+flow */
326   parse data,mod,5          /* parse in 5 bit packet length */
327   inject bucket,4           /* align length */
328   store stuff_counter
329   stuff data,mod
330   active enable_parity
331   inject mod,16             /* generate CRC */
332   release enable_parity
333   release enable_crc
334   release encode_fec2
335   active sent
336   branch end_of_packet,always
```

```
transmit_dm3:
transmit_dm5:
337  active enable-crc
338  active encode_fec2
339  parse data,mod,3        /* send lch+flow */
340  parse data,mod,9        /* parse in 9 bit packet length
                                */
341  store stuff_counter
342  parse data,mod,4        /* undefined*/
343  stuff data,mod
344  active enable_parity
345  inject mod,16   /* generate CRC */
346  release enable_parity
347  release encode_fec2
348  release enable_crc
349  active sent
350  branch end_of_packet,always transmit_dv:
351  copy v_numitems,temp
352  increase 0xff6,temp  /* add -10 */
353  compare 0x100,temp,0x100  /* check to see if negative, ie,
numitems < 10 */
354  branch dv_hv1_enough,false   /* enough for hv1 */
355  branch dv_dm1_only,got_tx    /* enough only for dm1 */
356  branch transmit_null,always /* not enough for anything */ dv_hv1_enough:
357  compare 0,flow,0x01 /* 1=go, 0=stop */
358  branch dv_hv1_only,true
359  branch dv_hv1_dm1_both,got_tx
dv_hv1_only:
360  force 5,temp   /* send hv1 instead */
```

```
361   preload temp
362   call sb_transmit_header_after_type,always
363   branch transmit_hv1_payload,always dv_dm1_only:
364   compare 0,flow,0x01              /* go = 1, stop = 0 */
365   branch transmit_null,true
366   force 3 temp     /* send dm1 instead */
367   preload temp
368   call sb_transmit_header_after_type,always
369   branch transmit_dm1,always dv_hv1_dm1_both:
370   preload typex
371   call sb_transmit_header_after_type,always
372   active encode_fec0
373   force 10,stuff_counter
374   stuff voice,mod
375   release encode_fec0
376   branch transmit_dm1,always transmit_aux1:
377   active encode_fec0
378   parse data,mod,3
379   parse data,mod,5
380   inject bucket,4 /* align it to 9 */
381   store stuff_counter
382   stuff data,mod
383   release encode_fec0
384   active sent
385   active ack
386   branch end_of_packet,always
```

```
transmit_dh1:
387   active enable_crc
388   active encode_fec0
389   parse data,mod,3      /* send 1ch+flow */
390   parse data,mod,5
391   inject bucket,4 /* align it to 9 */
392   store stuff_counter
393   stuff data,mod
394   active enable-parity
395   inject mod,16    /* send crc */
396   release enable_parity
397   release enable_crc
398   release encode_fec0
399   active sent
400   branch end_of_packet,always transmit_dh3:
    transmit_dh5:
401   active enable_crc
402   active encode_fec0
403   parse data,mod,3      /* send 1ch1+flow */
404   parse data,mod,9
405   store stuff_counter
406   parse data,mod,4      /* undefined */
407   stuff data,mod
408   active enable_parity
409   inject mod,16
410   release enable_parity
411   release enable_crc
412   release encode_fec0
413   active sent
414   branch end_of_packet,always
```

```
  transmit_hv1:
415   copy v_numitems,temp
416   increase 0xff6,temp   /* add -10 */
417   compare 0x100,temp,0x100   /* check to see if negative, ie,
numitems < 10 */
418   branch transmit_null,true   /* not enough for hv1 */
419   preload typex
420   call sb_transmit_header_after_type,always
  transmit_hv1_payload:
421   active encode_fec1
422   force 10, stuff_counter   /* 10 bytes, 80 bits, 240 bits
after fec */
423   stuff voice,mod
424   release encode_fec1
425   branch end_of_packet,always transmit_hv2:
426   copy v_numitems,temp
427   increase 0xfec,temp   /* add -20 */
428   compare 0x100,temp,0x100   /* check to see if negative, ie
numitems < 20 */
429   branch transmit_null,true   /* not enough for hv2 */
430   preload typex
431   call sb_transmit_header_after_type,always
432   active encode_fec2
433   force 20,stuff_counter    /* 20 bytes, 160 bits, 240 bits
after fec */
434   stuff voice,mod
435   release encode_fec2
436   branch end_of_packet,always transmit_hv3:
437   copy v_numitems,temp
```

```
438  increase 0xfe2,temp   /* add -30 */
439  compare 0x100,temp,0x100  /* check to see if negative, ie,
numitems < 30 */
440  branch transmit_null,true  /* not enough for hv3 */
441  preload typex
442  call sb_transmit_header_after_type,always
443  active encode_fec0
444  force 30,stuff_counter   /* 30 bytes, 240 bits, no fec
*/
445  stuff voice,mod
446  release encode_fec0
447  branch end_of_packet,always sb_transmit_header_after_type:
448  inject mod,4
449  preload flowx
450  inject mod,1
451  preload arqnx
452  inject mod,1
453  preload seqnx
454  inject mod,1
455  active enable_parity
456  inject mod,8   /* transmit parity */
457  release enable_parity
458  release enable_hec
459  release encode_fec1
460  rtn , org 511
511  sleep
   end
   file "bt_rom"
```

What is claimed is:

1. A memory management method comprising:
   storing first microcode in at least one read-only memory;
   storing second microcode in at least one random access memory;
   storing at least one data bit in the at least one random access memory; and
   selecting either the first microcode or the second microcode for execution according to the at least one data bit, wherein the at least one read-only memory and the at least one random access memory have at least one common address.

2. The method of claim 1 comprising generating at least one address to retrieve the first microcode from the at least one read-only memory and to retrieve the second microcode and the at least one data bit from the at least one random access memory.

3. The method of claim 2 wherein the at least one address comprises one address for reading the second microcode and the at least one data bit from the at least one random access memory.

4. The method of claim 2 wherein selecting comprises multiplexing the retrieved first microcode from the at least one read-only memory and the retrieved second microcode from the at least one random access memory according to the at least one data bit.

5. A system comprising:
   at least one read-only memory for storing first executable code;
   at least one random access memory for storing second executable code; and
   at least one multiplexer, coupled to receive the first executable code from the at least one read-only memory and the second executable code from the at least one random access memory and at least one data bit, wherein the at least one multiplexer outputs executable code for execution by selecting either the first executable code or the second executable code according to the at least one data bit, wherein the at least one read-only memory and the at least one random access memory have at least one common address.

6. The system of claim 5 wherein the second executable code comprises patched code.

7. The system of claim 5 further comprising at least one program counter for generating at least one address to access the at least one read-only memory and the at least one random access memory.

8. The system of claim 5 wherein the at least one data bit is stored in the at least one random access memory and the at least one multiplexer is coupled to receive the at least one data bit from the at least one random access memory.

9. The system of claim 8 further comprising at least one program counter for generating at least one address to access the first executable code in the at least one read-only memory and the second executable code and the at least one data bit in the at least one random access memory.

10. The system of claim 8 wherein at least a portion of the second executable code and at least a portion of the at least one data bit are stored at the same address in the at least one random access memory.

11. A system comprising:
    at least one read-only memory device with programmed ROM microcode;
    at least one random access memory device capable of loading RAM microcode and at least one RAM data bit used for the selection of corresponding ROM microcode or RAM microcode for execution;
    a multiplexer with input signals from ROM microcode and RAM microcode, an input from said at least one RAM data bit, and a single output signal selected from the RAM or ROM input signals as determined by said at least one RAM data bit, wherein the at least one read-only memory and the at least one random access memory have at least one common address.

12. The system of claim 11, wherein said at least one read-only memory device contains embedded microprocessor instructions and said at least one random access memory device contains microcode for execution.

13. The system of claim 11, wherein the address for each microcode instruction to be executed is stored in the at least one random access memory device, the address selectably located in the at least one random access memory device or the at least one read-only memory device and containing microcode for execution.

14. The system of claim 11, wherein ROM microcode instructions correspond to random access memory address locations and the at least one RAM data bit, the RAM address locations containing microcode and being selected for execution by the multiplexer depending upon the condition of the at least one RAM data bits.

15. The system of claim 11, wherein ROM microcode instructions are associated with corresponding RAM data bits, the RAM data bits used by the multiplexer to execute instructions from the at least one read-only memory device or the at least one random access memory device.

16. A system comprising:
    a read-only memory having a first microcode stored therein, the read-only memory comprising a plurality of first storage units, each first storage unit having a predetermined width;
    a random access memory comprising a plurality of second storage units, each second storage unit having a width greater than the predetermined width, each second storage unit having a first portion of the predetermined width and a second portion, at least one first portion having stored therein a second microcode;
    a multiplexer having a first input port coupled to the read-only memory, a second input port coupled to said first portions of the random access memory, a select input terminal coupled to the second portion of the random access memory, and an output port coupled to one of the first input port and the second input port based on a signal received at the select input terminal; and
    a logic circuit coupled to the output port of the multiplexer, for executing in the alternative one of the first microcode and the second microcode, wherein the read-only memory and the random access memory have at least one common address.

17. A system comprising:
    at least one read-only memory for storing a first set of addresses;
    at least one random access memory for storing a second set of addresses; and
    at least one multiplexer, coupled to receive the first set of addresses from the at least one read-only memory and the second set of addresses from the at least one random access memory and at least one data bit, wherein the at least one multiplexer outputs an address to access code for execution by selecting either the first set of addresses or the second set of addresses according to the at least one data bit, wherein the at least one read-only memory and the at least one random access memory have at least one common address.

18. The system of claim 17 wherein the at least one data bit comprises at least one select bit stored in the at least one data memory.

19. A system comprising:
at least one read-only memory for storing a first set of addresses;
at least one random access memory for storing a second set of addresses; and
at least one multiplexer, coupled to receive the first set of addresses from the at least one read-only memory and the second set of addresses from the at least one random access memory and at least one data bit, wherein the at least one multiplexer outputs an address to access code for execution by selecting either the first set of addresses or the second set of addresses according to the at least one data bit,
wherein the at least one data bit comprises at least one control bit from a program counter.

20. The system of claim 17 further comprising at least one program counter for generating addresses to access the first set of addresses in the at least one read-only memory and the second set of addresses and the at least one data bit stored in the at least one random access memory.

21. A system comprising:
at least one read-only memory for storing a first set of addresses;
at least one random access memory for storing a second set of addresses; and
at least one multiplexer, coupled to receive the first set of addresses from the at least one read-only memory and the second set of addresses from the at least one random access memory and at least one data bit, wherein the at least one multiplexer outputs an address to access code for execution by selecting either the first set of addresses or the second set of addresses according to the at least one data bit, further comprising at least one index random access memory for storing at least one remap address, the at least one index random access memory coupled to receive one of the first set of addresses or one of the second set of addresses to output a remapped address according to the at least one remap address and either the received one of the first set of addresses or one of the second set of addresses.

22. A memory management method comprising:
associating first executable code stored, in at least one read-only memory with addresses of locations in at least one random access memory, wherein the at least one read-only memory and the at least one random access memory have at least one common address;
storing second executable code in the at least one random access memory;
associating the locations in at least one random access memory with the second executable code; and
selecting either the first executable code or the second executable code for execution according to at least one control bit.

23. The method of claim 22 wherein associating comprises storing, in the locations, addresses of routines in the second executable code.

24. The method of claim 23 wherein selecting comprises:
identifying a portion of the first executable code for execution;
retrieving one of the addresses of routines from one of the locations; and
retrieving, according to the retrieved address, executable code from the at least one random access memory.

* * * * *